United States Patent
Katagiri et al.

(10) Patent No.: US 8,357,002 B2
(45) Date of Patent: Jan. 22, 2013

(54) LOCKING DEVICE

(75) Inventors: Toshiharu Katagiri, Aichi (JP); Keiji Kahara, Aichi (JP); Takahiro Hirashita, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 100 days.

(21) Appl. No.: 13/154,114

(22) Filed: Jun. 6, 2011

(65) Prior Publication Data

US 2011/0300728 A1    Dec. 8, 2011

(30) Foreign Application Priority Data

Jun. 8, 2010    (JP) .................................. 2010-131054

(51) Int. Cl.
*H01R 13/62*    (2006.01)

(52) U.S. Cl. ........... 439/304; 439/352; 439/299; 285/82

(58) Field of Classification Search ............... 439/304, 439/299, 352, 350, 347, 174, 142, 144; 285/84, 285/85, 87, 81, 82
See application file for complete search history.

(56) References Cited

U.S. PATENT DOCUMENTS

| | | | | |
|---|---|---|---|---|
| 5,751,135 | A * | 5/1998 | Fukushima et al. | 439/476.1 |
| 6,790,070 | B1 * | 9/2004 | England, II | 439/345 |
| 7,059,877 | B2 * | 6/2006 | Guzelderli | 439/142 |
| 8,075,329 | B1 * | 12/2011 | Janarthanam et al. | 439/304 |
| 8,251,734 | B2 * | 8/2012 | Katagiri et al. | 439/352 |
| 2012/0047971 | A1 * | 3/2012 | Katagiri et al. | 70/58 |

FOREIGN PATENT DOCUMENTS

JP    09-161898    6/1997

* cited by examiner

*Primary Examiner* — Felix O Figueroa
(74) *Attorney, Agent, or Firm* — Patterson Thuente Christensen Pedersen, P.A.

(57) ABSTRACT

A locking device that locks a power feeding plug to a power receiving connector and locks a lid covering the power receiving connector. The locking device includes a lock bar that locks a hook, which is arranged on the power feeding plug, to a catch, which is arranged on the power receiving connector. A hook restriction member permits and restricts movement of the lock bar. A lid restriction member permits and restricts opening of the lid. A motor moves the hook and lid restriction members.

9 Claims, 16 Drawing Sheets

[State A]

[State A]

[State B]

[State B]

[State C]

[State C]

[State D]

[State D]

[State C]

[State C]

[State A]

LOCKING DEVICE

CROSS-REFERENCE TO RELATED APPLICATIONS

This application is based upon and claims the benefit of priority from prior Japanese Patent Application No. 2010-131054, filed on Jun. 8, 2010, the entire contents of which are incorporated herein by reference.

BACKGROUND OF THE INVENTION

The present invention relates to a locking device that locks a power feeding plug to a power receiving connector and locks a lid covering the power receiving connector.

Automobile manufactures are now concentrating on the development of electric vehicles (include hybrid vehicles), which use motors as drive sources and lower exhaust gas emissions. Such an electric vehicle includes a battery, which supplies power to the motor. The battery must be charged in a household or at a charging station whenever the state of charge of the battery becomes low. Thus, an electric vehicle is provided with a charging system that is easy for a user to use. Japanese Laid-Open Patent Publication No. 9-161898 describes a conventional example of a charging system. In this charging system, a vehicle includes an inlet (power receiving connector), which is connectable to a power feeding plug that extends from, for example, a household outlet of a commercial power supply. The user charges the battery of the vehicle by connecting the power feeding plug to the inlet of the parked vehicle after coming home. The power feeding plug includes a hook, and the inlet includes a catch. Engagement of the hook and catch keep the power feeding plug and inlet connected to each other. An operation portion, which is arranged on the power feeding plug, is operated to move and release the hook from the catch. This allows for the power feeding plug to be removed from the inlet.

Although a fast charging technique is being developed, the time required to charge the battery of electric vehicles is still relatively long compared to filling a gasoline vehicle with fuel. Moreover, a fast charger is normally not installed in a typical household. Thus, when the user charges the battery at home, the vehicle is sometimes left unattended over a long period of time with the power feeding plug connected to the inlet of the vehicle. In such a case, someone may remove the power feeding plug from the vehicle when power is being fed from the household power supply and connect the power feeding plug to an inlet of another vehicle to steal electricity. There is also the possibility of the power feeding plug being stolen for the metal used in the power feeding plug.

Accordingly, a plug locking device that locks the power feeding plug to the inlet is arranged in the inlet to prevent unauthorized removal of the power feeding plug from the inlet. The plug locking device includes a lock bar, which is driven by a motor and moved between a lock position and an unlock position. When engagement of the hook of the power feeding plug with the catch of the inlet is detected, the lock bar moves from the unlock position to the lock position to lock the hook. This restricts movement of the hook. Since the hook and catch cannot be disengaged from each other, the power feeding plug cannot be removed from the inlet. Then, when an unlocking condition is satisfied, the lock bar is moved from the lock position to the unlock position to unlock the hook. This permits movement of the hook. Operation of the operation portion disengages the hook from the catch and allows the power feeding plug to be removed from the inlet.

The vehicle includes a lid that functions to protect the inlet from the ambient environment without affecting the aesthetic appearance of the vehicle. A lid locking device locks the lid so that the lid does not open when the vehicle is traveling.

When the plug locking device is discrete from the lid locking device as described above, space for the lid locking device in addition to space for the plug locking device should be provided in the vehicle. In this case, it is preferable that these locking devices be arranged near the inlet. However, the space near the inlet is limited. Accordingly, there is a demand for a smaller inlet.

SUMMARY OF THE INVENTION

The present invention provides a locking device that allows for reduction in size, while locking a power feeding plug to a power receiving connector and locking a lid covering the power receiving connector.

One aspect of the present invention is a locking device that locks a power feeding plug to a power receiving connector and locks a lid covering the power receiving connector. One of the power feeding plug and the power receiving connector includes a hook, and the other one of the power feeding plug and the power receiving connector includes a catch. The locking device includes a first hook restriction member moved between a first hook lock position and a first hook unlock position. The first hook restriction member at the first hook lock position holds the hook on the catch. The first hook restriction member at the first hook unlock position permits the hook to move away from the catch. When the hook moves away from the catch, the first hook restriction member moves to the first hook unlock position in cooperation with the hook. A second hook restriction member is moved between a second hook lock position and a second hook unlock position. The second hook restriction member at the second hook lock position engages with the first hook restriction member, which is located at the first hook lock position, and restricts movement of the first hook restriction member. The second hook restriction member at the second hook unlock position disengages from the first hook restriction member and permits movement of the first hook restriction member. A lid restriction member is moved between a lid lock position and a lid unlock position. The lid restriction member at the lid lock position engages with a lid engagement member arranged on the lid and restricts opening and closing of the lid. The lid restriction member at the lid unlock position disengages from the lid engagement member and permits opening and closing of the lid. A drive source is operably coupled to both of the second hook restriction member and the lid restriction member.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE EMBODIMENTS

A locking device for a power feeding plug according to a first embodiment of the present invention will now be described with reference to the drawings. The present invention is applied to a plug-in type hybrid vehicle.

Figure 1:
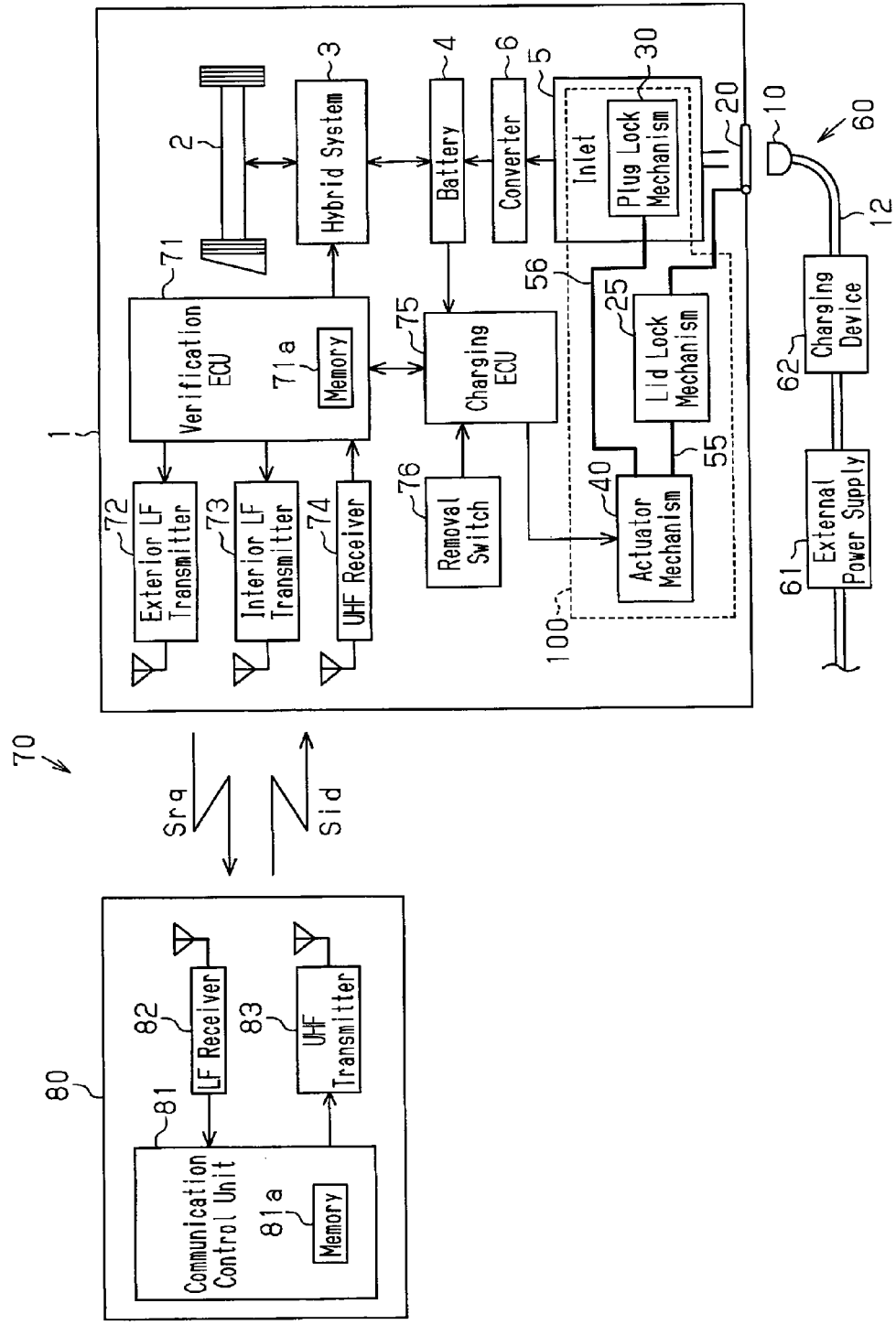
FIG. 1 is a schematic bock diagram of a charging system and an electronic key system according to a first embodiment of the present invention.

Referring to FIG. 1, a hybrid vehicle 1 includes a hybrid system 3 that uses an engine and a motor, which serve as driving sources for driving wheels 2. The hybrid system 3 is connected to a battery 4.

The hybrid system 3 operates in various traveling modes, such as a mode for mechanically transmitting power from only the engine to the driving wheels 2, a mode for directly driving the driving wheels 2 with both the engine and the motor, and a mode for driving the driving wheels 2 with only the motor and without the engine. The hybrid system 3 selects one of the traveling modes in accordance with the traveling state of the vehicle. The hybrid system 3 controls various types of charging modes, such as a mode for generating electric power with the engine to charge the battery 4 and a mode for generating electric power with the motor by converting the energy generated when braking the driving wheels 2 to charge the battery 4. The hybrid system 3 selects one of the charging modes in accordance with the traveling state of the vehicle. The vehicle 1 travels in the traveling mode controlled by the hybrid system 3.

Figure 5:
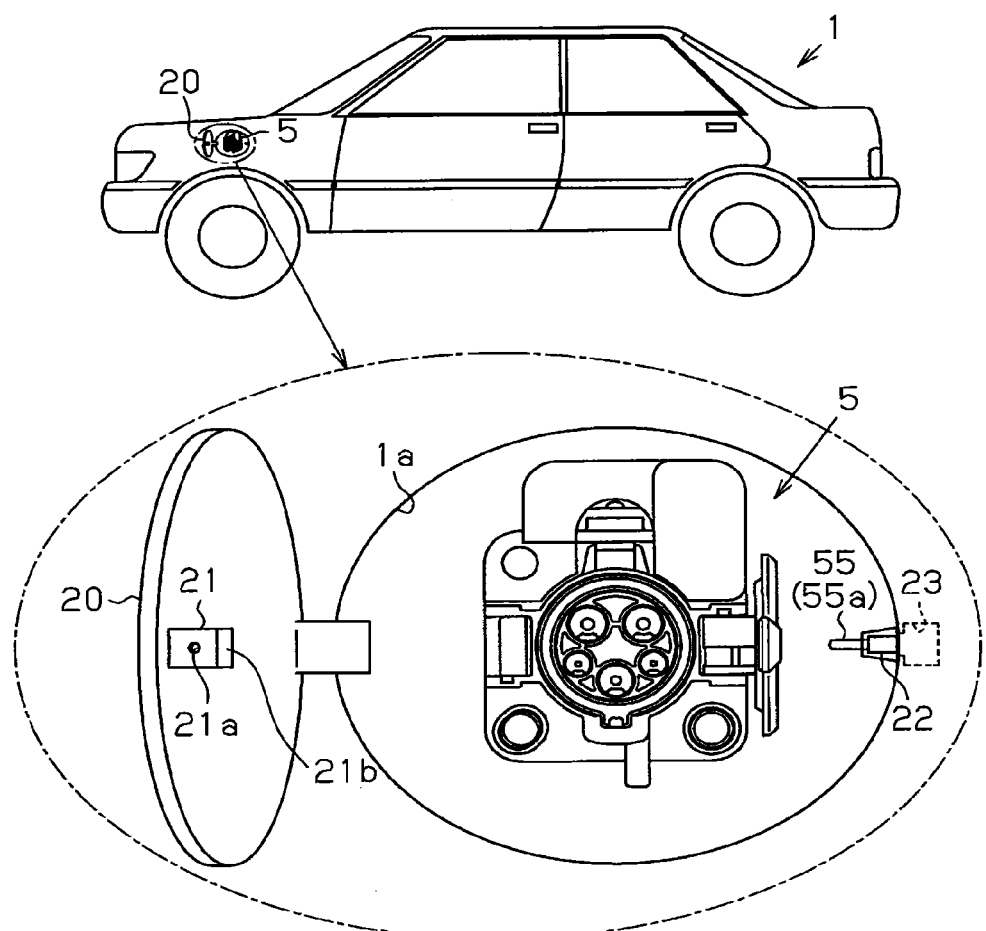
FIG. 5 is an outer view of a vehicle recess in which the inlet is arranged.

An inlet 5, which serves as a power receiving connector, is connected to the battery 4 by a converter 6. The inlet 5 is a connector component into which a power feeding plug 10 is inserted. The power feeding plug 10 is connected by a charging device 62 to an external power supply (AC power supply) 61 of the vehicle 1. As shown in FIG. 5, the inlet 5 is arranged in a vehicle recess 1a located in a front side wall of the vehicle 1 in the same manner as a fuel inlet of a gasoline vehicle. The charging device 62 transmits a connection signal to the vehicle 1 when the power feeding plug 10 is inserted into the inlet 5. The converter 6 converts AC voltage, which is supplied from the power feeding plug 10 through the inlet 5, to DC voltage. Then, the converter 6 sends the converted DC voltage to the battery 4. In this manner, the external power supply 61 is used to charge the battery 4.

The vehicle 1 includes an electronic key system 70 that uses an electronic key 80, which serves as a vehicle key. For instance, the electronic key system 70 controls locking and unlocking of the door without having the user actually operate the electronic key 80. In the electronic key system 70, vehicle control is executed through wireless communication between the vehicle 1 and the electronic key 80, which is carried by the user.

The electronic key system 70 will now be described in detail. A verification ECU 71 is mounted on the vehicle 1. The verification ECU 71 is connected to an exterior low frequency (LF) transmitter 72, an interior LF transmitter 73, and an ultrahigh frequency (UHF) receiver 74. The exterior LF transmitter 72 is arranged in each door of the vehicle 1 and transmits a signal carried on the LF band outside the vehicle. The interior LF transmitter 73 is arranged in the floor inside the vehicle and transmits a wireless signal carried on LF band inside the vehicle. The UHF receiver 74 is arranged at the rear of the vehicle body inside the vehicle and receives a wireless signal carried on the UHF band. The verification ECU 71 includes a memory 71a in which an ID code unique to the electronic key 80 is stored.

A communication control unit 81 is arranged in the electronic key 80. The communication control unit 81 is connected to an LF receiver 82, which receives a signal on the LF band, and an UHF transmitter 83, which transmits a signal on the UHF band in accordance with a command from the communication control unit 81. The communication control unit 81 includes a memory 81a in which an ID code unique to the electronic key 80 is stored.

The verification ECU 71 forms a communication area around the vehicle 1 by intermittently transmitting a request signal Srq from the exterior LF transmitter 72. When the user carries the electronic key 80 into the communication area, the LF receiver 82 receives the request signal Srq. In response to the request signal Srq, the communication control unit 81 returns an ID code signal Sid, which contains the ID code registered in the memory 81a, from the UHF transmitter 83. When the UHF receiver 74 receives the ID code signal Sid, the verification ECU 71 compares the received ID code and the ID code registered in the memory 71a to perform ID verification (exterior verification) on the electronic key 80. When the exterior verification is accomplished, the verification ECU 71 permits or performs unlocking of the doors with a door locking device (not shown).

After the exterior verification is accomplished and the door is unlocked, the verification ECU 71 transmits the request signal Srq from the interior LF transmitter 73 to form an interior communication area that extends over the entire interior of the vehicle. When the user carries the electronic key 80 into the interior communication area, the LF receiver 82 receives the request signal Srq. Then, the communication control unit 81 returns an ID code signal Sid containing the ID code registered in the memory 81a from the UHF transmitter 83. When the UHF receiver 74 receives the ID code signal Sid, the verification ECU 71 compares the received ID code and the ID code registered in the memory 71a to perform ID verification (interior verification) on the electronic key 80. When the interior verification is accomplished, the verification ECU 71 permits activation of the hybrid system 3.

In the present embodiment, the ID code verification of the electronic key system 70 is also performed when charging the battery 4 of the vehicle 1 with the external power supply 61. The vehicle 1 includes a charging ECU 75 that executes charging control. The charging ECU 75 communicates with the verification ECU 71 through an in-vehicle local area network (LAN) (not shown) to check the result of the ID verification performed by the verification ECU 71. The charging ECU 75 is also electrically connected to a removal switch 76 arranged in the vehicle 1. Further, the charging ECU 75 is electrically connected to a locking device 100.

The locking device 100 performs an unlock operation, which permits the connection and disconnection of the inlet 5 and power feeding plug 10, and a lock operation, which restricts the connection and disconnection of the inlet 5 and power feeding plug 10. Further, the locking device 100 performs a lid lock operation, which restricts movement of a power feeding lid 20 arranged in a vehicle recess 1a (refer to FIG. 5) in an opening direction, and a lid unlocking operation, which permits movement of the power feeding lid 20. The charging ECU 75 switches the locking device 100 between the lock operation and the unlock operation in accordance with the result of the exterior verification. Prior to accomplishment of the exterior verification, the locking device 100 restricts connection between the inlet 5 and the power feeding plug 10 and movement of the power feeding lid 20 in an opening direction. When the charging ECU 75 confirms the accomplishment of the exterior verification performed by the verification ECU 71, the locking device 100 performs the unlock operation and permits charging of the battery 4. When the inlet 5 and the power feeding plug 10 are connected in this state, the charging ECU 75 receives the connection signal from the charging device 62 and starts charging the battery 4 with the external power supply 61 through the control of the converter 6. Accordingly, a person who does not have the electronic key 80 cannot perform the unlock operation with the locking device 100. The exterior communication area is formed around the entire vehicle 1. Thus, as long as the user, who is carrying the electronic key 80, stands by the inlet 5, which is arranged in the front side wall of the vehicle 1, the exterior verification is executed without any problems. The locking device 100 will be described in detail later.

Figure 2:
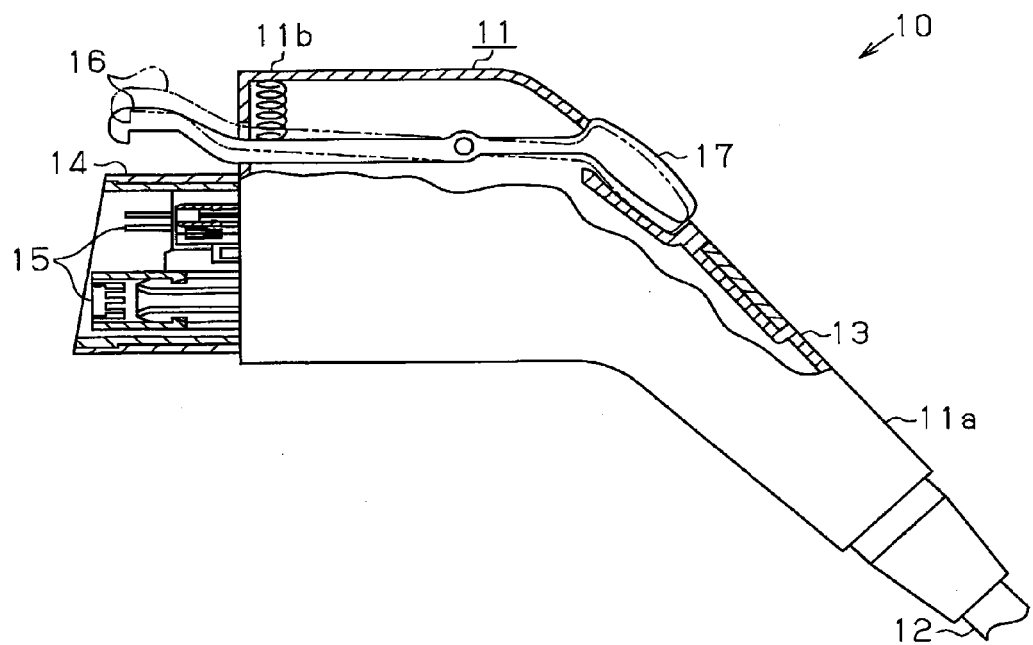
FIG. 2 is a partial cross-sectional view showing a power feeding plug arranged in the charging system of FIG. 1.

As shown in FIG. 2, the power feeding plug 10 includes a plug body 11. The plug body 11 includes a basal end 11a connected to a cable 12, which is electrically connected to the external power supply 61 (see FIG. 1). A grip 13, which the user grasps, is formed near the middle of the plug body 11. Further, the plug body 11 includes a distal end 11b. A cylindrical coupler 14, which is fitted to the inlet 5, is arranged in the distal end 11b. Connection terminals 15 are arranged in the coupler 14. The connection terminals 15 include a power terminal, which transmits power, and a control terminal, which communicate control commands.

A hook 16 is arranged on an upper part of the coupler 14 to keep the power feeding plug 10 and inlet 5 connected to each other. The hook 16 is pivotal about a pin arranged in the plug body 11. The hook 16 is moved between a first position, which is indicated by the solid lines in FIG. 2, and a second position, which is indicated by the broken lines. When the power feeding plug 10 is inserted into the inlet 5 and the hook 16 is pivoted to the first position to engage part of the inlet 5, the power feeding plug 10 and the inlet 5 are kept connected. When the hook 16 is pivoted to the second position and disengaged from part of the inlet 5, the power feeding plug 10 is removable from the inlet 5. The hook 16 is normally resiliently held at the first position. The hook 16 is moved to the second position (tilted state) when an operation portion 17, which is arranged in the upper part of the plug body 11, is pushed. The hook 16 resiliently returns to the first position when the operation portion 17 is released.

Figure 3A:
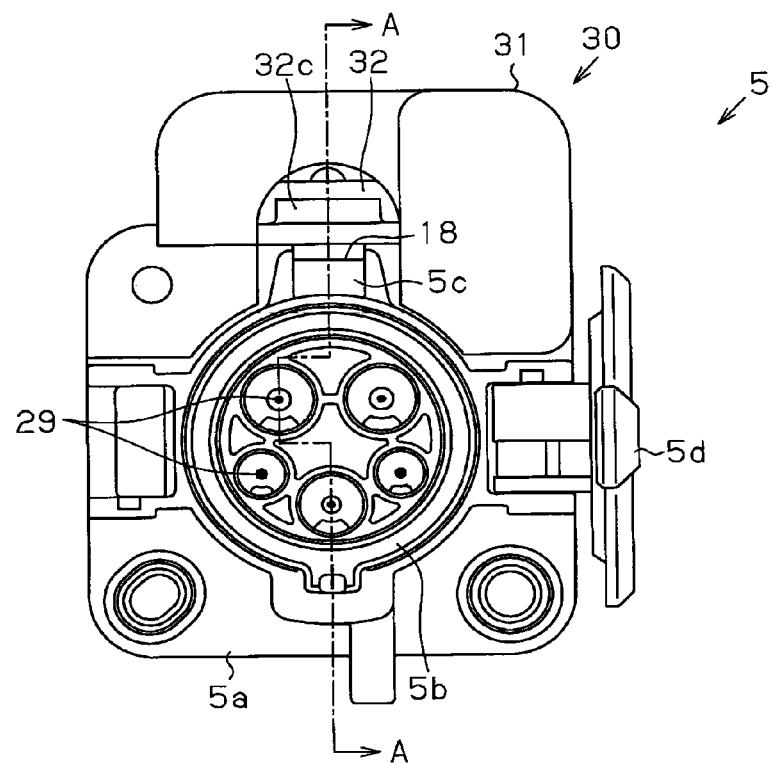
FIG. 3A is a schematic front view showing an inlet and a lock mechanism arranged in the charging system of FIG. 1.
Figure 3B:
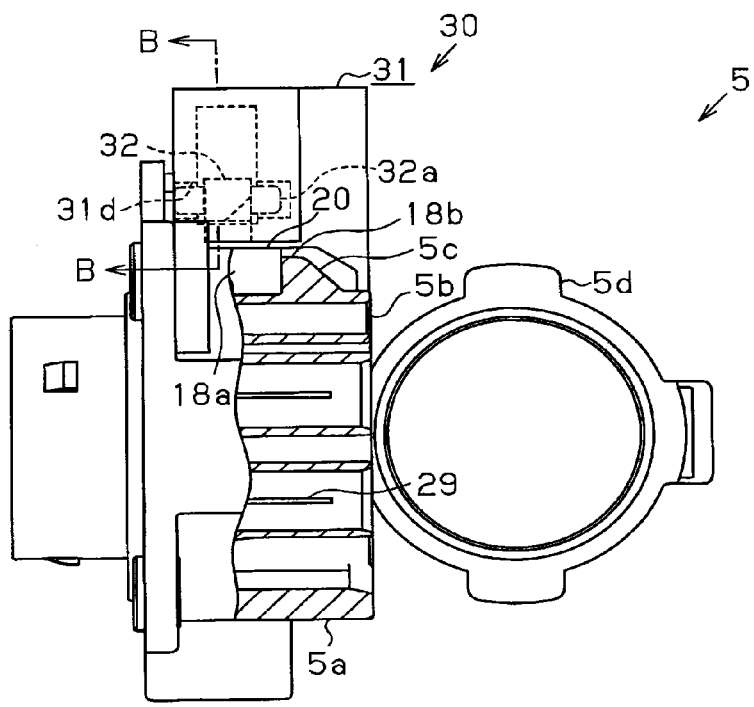
FIG. 3B is a cross-sectional view taken along line A-A in FIG. 3A.

As shown in FIGS. 3A and 3B, the inlet 5 includes an inlet body 5a. The inlet body 5a includes a cylindrical receptacle 5b, into which the coupler 14 of the power feeding plug 10 is inserted. Connection terminals 29 are arranged in the cylindrical receptacle 5b. The connection terminals 29 include a power terminal, which transmits power, and a control terminal, which communicates control commands. When the coupler 14 is inserted into the cylindrical receptacle 5b, the power terminal of the coupler 14 is connected to the power terminal of the cylindrical receptacle 5b and the control terminal of the coupler 14 is connected to the control terminal of the cylindrical receptacle 5b. The inlet 5 also includes an inlet lid 5d, which covers the cylindrical receptacle 5b to protect the connection terminal 29 from the ambient environment. The inlet lid 5d is pivotally supported beside the cylindrical receptacle 5b.

A catch 18, which is engageable with the hook 16, is formed on the upper part of the inlet body 5a. The catch 18 includes an inclined surface 5c, which forms a plug insertion port. The inclined surface 5c is gradually inclined upward in the insertion direction of the power feeding plug 10. Accordingly, the inclined surface 5c moves the hook 16 from the first position to the second position when the power feeding plug 10 is inserted into the inlet 5. The catch 18 includes an engagement recess 18a, which allows for insertion and tilting of the hook 16. The hook 16 engages a wall 18b (refer to FIG.

8) of the recess 18a. Engagement of the hook 16 with the wall 18b restricts movement of the power feeding plug 10 relative to the inlet 5 in the removal direction.

The locking device 100 will now be described. As shown in FIG. 1, the locking device 100 includes a lid lock mechanism 25, a plug lock mechanism 30 and an actuator mechanism 40. The lid lock mechanism 25 restricts and permits movement of the power feeding lid 20 in the opening direction. The plug lock mechanism 30 restricts and permits tilting (pivoting) of the hook 16. The actuator mechanism 40 drives the lid lock mechanism 25 and the plug lock mechanism 30 to switch operation states of these mechanisms 25 and 30.

Figure 4:
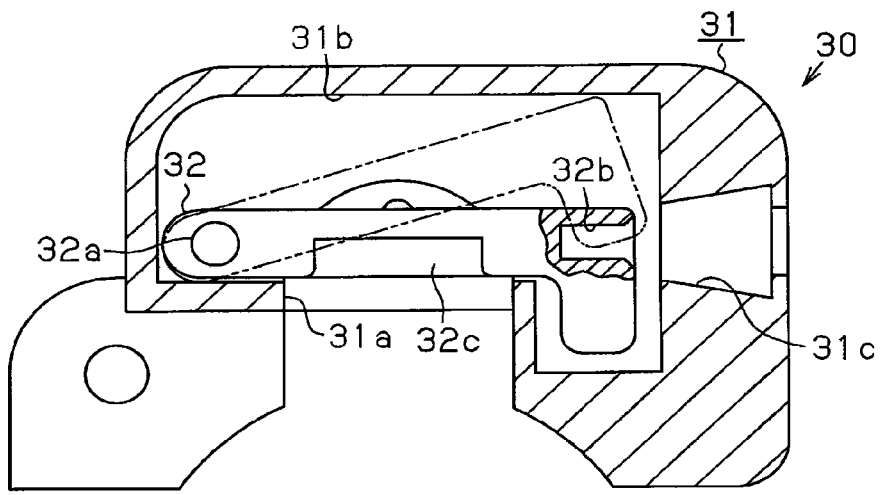
FIG. 4 is a cross-sectional view taken along line B-B in FIG. 3B.

As shown in FIGS. 3A and 3B, the plug lock mechanism 30 is arranged at the upper part of the inlet body 5a. As shown in FIG. 4, the plug lock mechanism 30 includes a case 31, which is fixed to the upper part of the inlet body 5a, and a lock bar 32, which serves as a first hook restriction member accommodated in the case 31. The case 31 includes a tunnel-like opening 31a extending above the catch 18. The opening 31a allows the hook 16 to be tilted, that is, moved to the second position. The case 31 includes a lock bar compartment 31b, which is in communication with the opening 31a, and a holder compartment 31c, which is in communication with the lock bar compartment 31b. The lock bar compartment 31b is arranged above the opening 31a. The holder compartment 31c is arranged beside (right side as viewed in FIG. 4) of the lock bar compartment 31b. The lock bar 32 is accommodated in the lock bar compartment 31b. In the present embodiment, the case 31 serves as a first case.

As shown in FIG. 4, the lock bar 32 includes a first end, in which a shaft 32a is arranged, and an opposite second end. The shaft 32a of the lock bar 32 is supported by a bearing 31d (see FIG. 3B) formed in the case 31. The lock bar 32 pivots about the shaft 32a and moves between a lock position (first hook lock position), which is indicated by solid lines in FIG. 4, and an unlock position (first hook unlock position), which is indicated by broken lines in FIG. 4. The lock bar 32 includes a central part that is exposed from the opening 31a in the lock position. The lock bar 32 moves to the unlock position when pivoted upward from the lock position.

Figure 8:
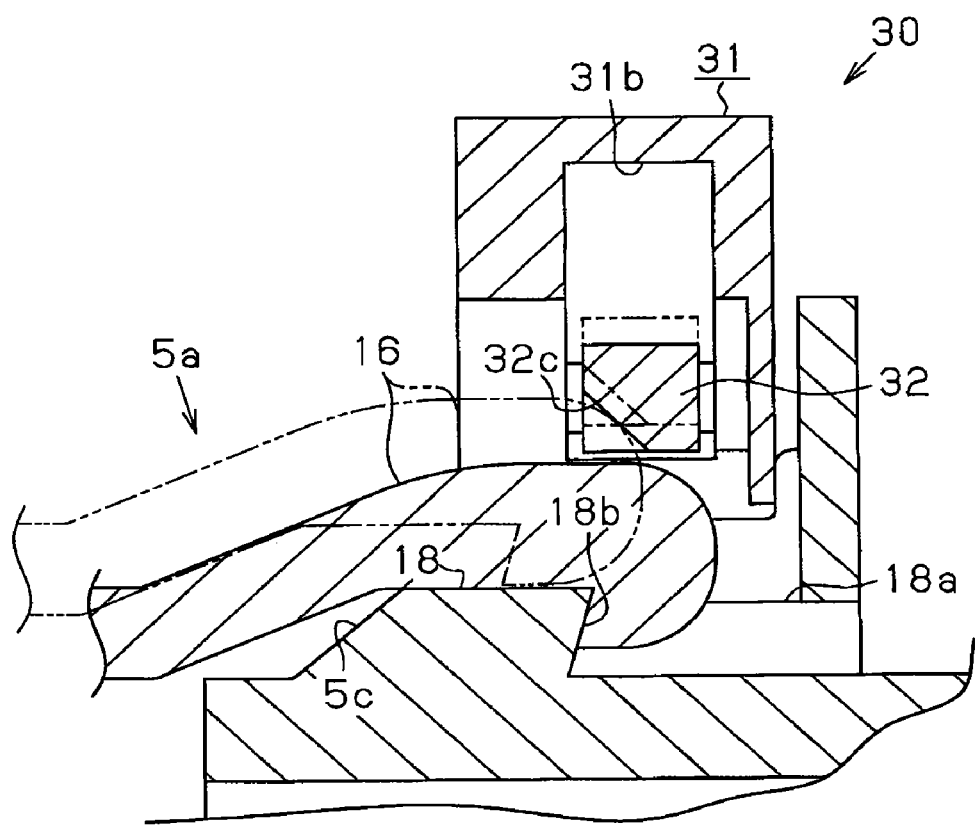
FIG. 8 is a cross-sectional view showing movement of a hook and the lock bar during insertion of the power feeding plug into the inlet when the lock bar is unlocked.

As shown in FIG. 8, the lock bar 32 is box-shaped. The lock bar 32 includes an inclined surface 32c formed by chamfering the central part of the lock bar 32. The inclined surface 32c is gradually inclined downward in the insertion direction of the power feeding plug 10. Accordingly, when the power feeding plug 10 is inserted into the inlet 5, the inclined surface 32c is pushed by the hook 16, which is tilted upward by the inclined surface 5c as described above. This moves the lock bar 32 to the unlock position. In this manner, the inclined surface 32c converts the pushing force received from the distal end of the hook 16 to force that moves the lock bar 32 upward (refer to FIG. 8). Accordingly, the pushing force applied by the hook 16 moves the lock bar 32 from the lock position to the unlock position.

As shown in FIG. 4, a lock recess 32b is formed in the end of the lock bar 32 opposite to the shaft 32a, namely, the second end of the lock bar 32. The lock recess 32b extends in the longitudinal direction of the lock bar 32. The lock recess 32b faces the holder compartment 31c when the lock bar 32 is located at the lock position.

Figure 6A:
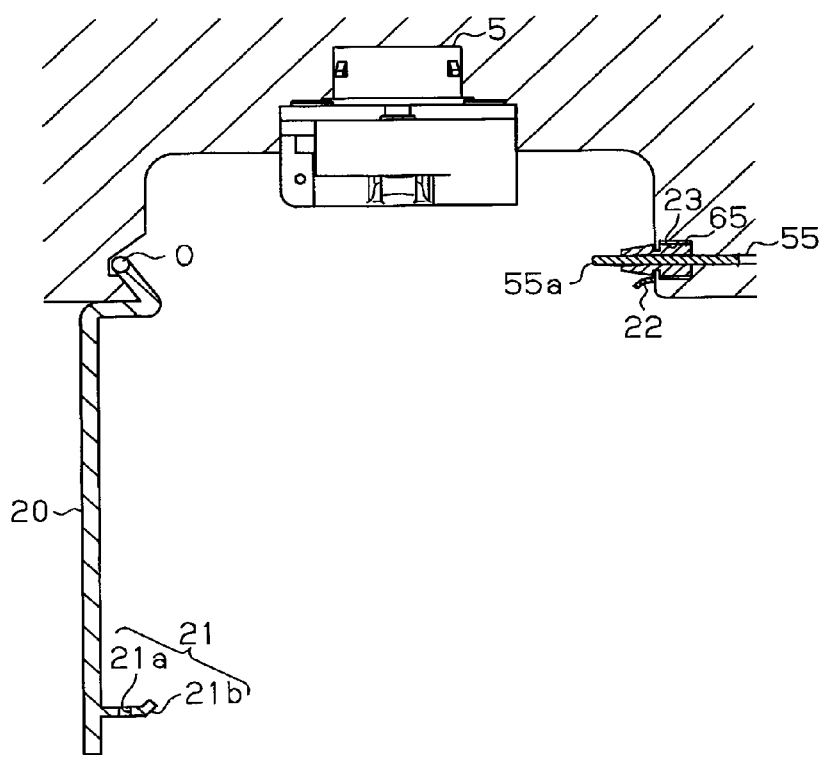
FIG. 6A is a cross-sectional view showing a vehicle recess when a power feeding lid is open.
Figure 6B:
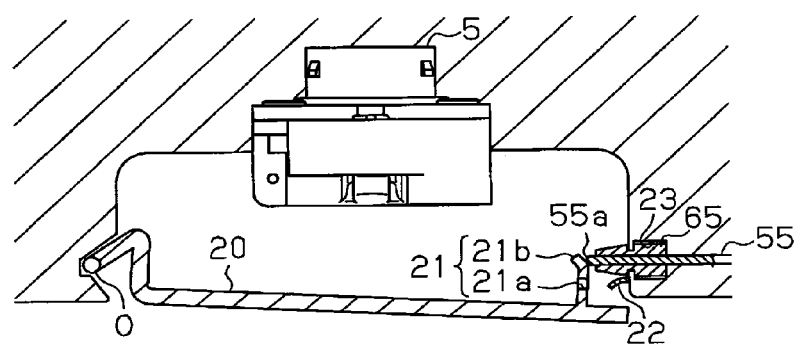
FIG. 6B is a cross-sectional view showing a vehicle recess when the power feeding plug is ajar.
Figure 6C:
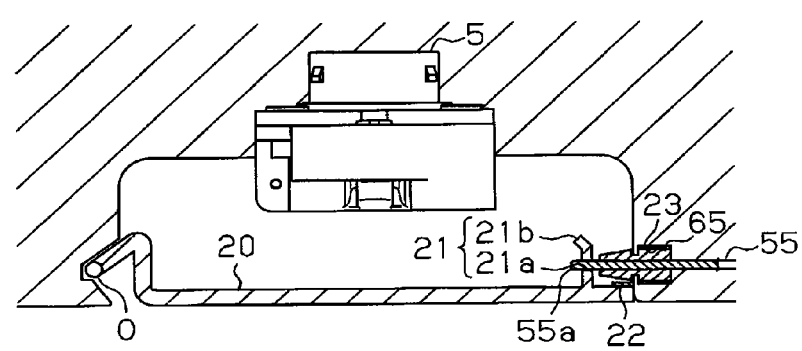
FIG. 6C is a cross-sectional view showing a vehicle recess when a power feeding plug is closed.

As shown in FIG. 5, the power feeding lid 20, which is arranged in the vehicle recess 1a, is pivotally supported by a hinge O (refer to FIG. 6), which is arranged in the recess 1a on a first side wall (left wall as viewed in FIG. 5) to open and close the recess 1a. As shown in FIG. 6C, when the power feeding lid 20 closes, the power feeding lid 20 forms part of an ornamental surface of the vehicle 1 and protects the inlet 5 from the ambient environment. A lock piece 21, which serves as a lid engagement member, is arranged on an inner surface of the power feeding lid 20. The lock piece 21 is arranged on, the power feeding lid 20 at the side opposite to the hinge O. A lock hole 21a extends through the lock piece 21 in a radial direction extending from the center of the hinge O. In this example, the lock piece 21 includes a distal portion defining a guide 21b, which is bent toward the hinge O.

A spring 22, which serves as an urging member that urges the power feeding lid 20 in the opening direction, is arranged in the vehicle recess 1a on a second side wall (right wall as viewed in FIG. 5). The spring 22 contacts the power feeding lid 20 when the power feeding lid 20 is in a closed state. Further, as shown in FIG. 6C, the second wall of the vehicle recess 1a includes a holder compartment 23, which is in communication with the recess 1a. The holder compartment 23 is closer to the inlet 5 than the spring 22. That is, the holder compartment 23 is located inward in the vehicle 1 from the spring 22.

Figure 9:
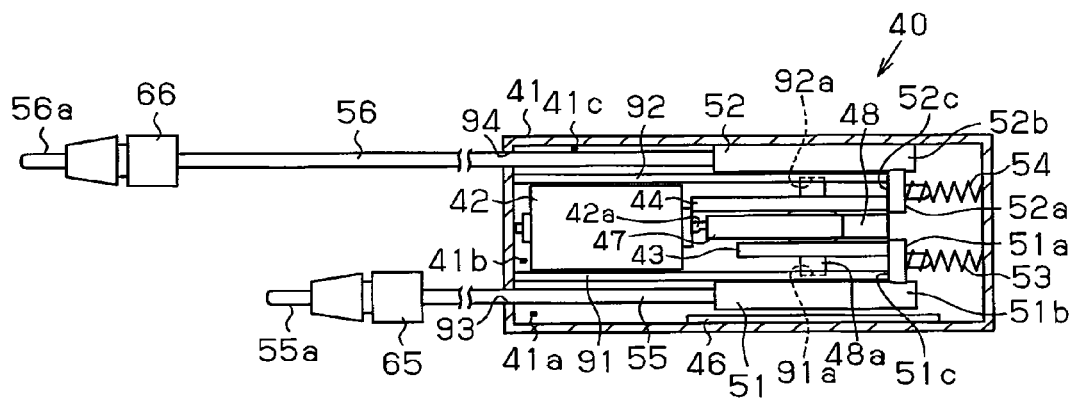
FIG. 9 is a front view showing an actuator mechanism when a lock bar restriction member and lid restriction member are both located at a lock position.

As shown in FIG. 1, an actuator mechanism 40 is arranged in the body of the vehicle 1. As shown in FIG. 9, the actuator mechanism 40 includes a case 41 fixed to the vehicle body, a motor 42 serving as a drive source, a first cam 43, and a second cam 44. The motor 42 and the first and second cams 43 and 44 are accommodated in the case 41. In the present embodiment, the case 41 serves as a second case.

Two partition plates 91 and 92 partition the interior of the case 41 into a lower first accommodating portion 41a, a middle second accommodating portion 41b, and an upper third accommodating portion 41c, which are in communication with each other at one side in the case 41 (right side as viewed in FIG. 9). A substrate 46, which is electrically connected to the charging ECU 75 (refer to FIG. 1), is fixed to an inner wall (lower wall) of the first accommodating portion 41a. The motor 42, which is electrically connected by a cable (not shown) to the substrate 46, is arranged in the second accommodating portion 41b. That is, the motor 42 is connected by the substrate 46 to the charging ECU 75. In this manner, the charging ECU 75 controls and drives the motor 42. The motor 42 is fixed between the partition plates 91 and 92. A motor shaft 42a projects toward the right from the motor 42. A worm gear 47, which rotates coaxially with the motor shaft 42a, is fixed to the motor shaft 42a. A worm wheel 48 is engaged with the worm gear 47. The worm wheel 48 is fixed to a shaft 48a, which extends in the vertical direction. The shaft 48a is supported by bearings 91a and 92a respectively formed in the partition plates 91 and 92. Thus, rotation of the motor shaft 42a rotates the worm wheel 48 with the worm gear 47.

The first and second cams 43 and 44 are disk-shaped. The first cam 43 is fixed to the shaft 48a below the worm wheel 48, with the shaft 48a extending through the first cam 43. The second cam 44 is fixed to the shaft 48a above the worm wheel 48, with the shaft 48a extending through the second cam 44. Thus, the first and second cams 43 and 44 are coaxial with the worm wheel 48. This integrally rotates the worm wheel 48 and the first and second cams 43 and 44.

Figure 10:
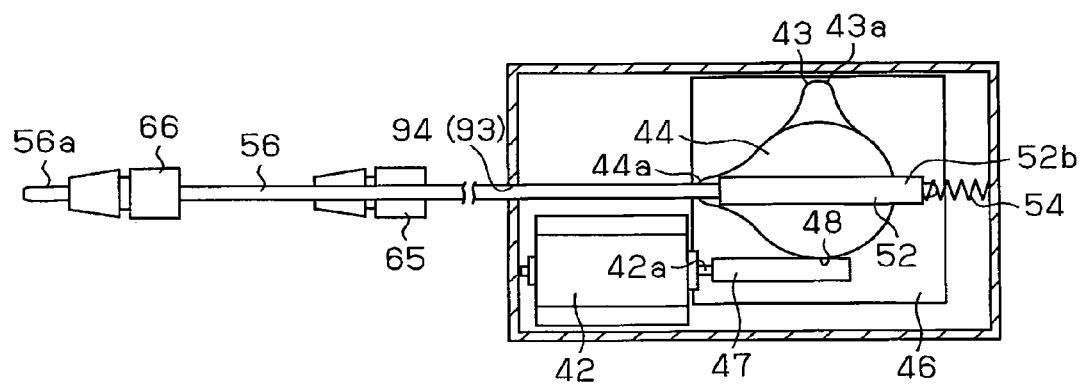
FIG. 10 is a plan view, partially in cross-section, showing the actuator mechanism of FIG. 9.

As shown in FIG. 10, the first cam 43 includes a peripheral surface. A cam lobe 43a smoothly projects from the peripheral surface of the first cam 43 in the radial direction. In the same manner, the second cam 44 includes a peripheral surface. A cam lobe 44a smoothly projects from the peripheral surface of the second cam 44 in the radial direction. The cam lobe 44a serves as a first projection, and the cam lobe 43a serves as a second projection. When the cam lobe 43a of the first cam 43 is oriented in the twelve o'clock direction, the cam lobe 44a of the second cam 44 is oriented in the nine o'clock direction.

As shown in FIG. 9, the first accommodating portion 41a includes a wire assembly 51. The wire assembly 51 includes a plate-shaped engagement piece 51a, which is arranged at the right side of the first cam 43, and a cylindrical sleeve 51b, which is fixed to an edge of the engagement piece 51a and accommodated in the first accommodating portion 41a. The engagement piece 51a and the cylindrical sleeve 51b are coupled to each other in an L-shaped manner. A coil spring 53 is arranged between the engagement piece 51a and the right inner wall of the case 41. Accordingly, the wire assembly 51 is biased toward the left by the elastic force of the coil spring 53. The engagement piece 51a is located at the right side of the partition plate 91. Thus, the engagement piece 51a is movable between the edge of the partition plate 91 and the right inner wall of the case 41. The engagement piece 51a includes a contact surface 51c, which faces toward the edge of the partition plate 91. Accordingly, contact of the contact surface 51c of the engagement piece 51a with the edge of the partition plate 91 restricts leftward movement of the wire assembly 51.

As shown in FIG. 9, the third accommodating portion 41c includes a wire assembly 52. The wire assembly 52 includes a plate-shaped engagement piece 52a, which is arranged at the right side of the second cam 44, and a cylindrical sleeve 52b, which is fixed to an edge of the engagement piece 52a and accommodated in the third accommodating portion 41c. The engagement piece 52a and the cylindrical sleeve 52b are coupled to each other in an L-shaped manner. A coil spring 54 is arranged between the engagement piece 52a and the right inner wall of the case 41. Accordingly, the wire assembly 52 is biased toward the left by the elastic force of the coil spring 54. The engagement piece 52a is located at the right side of the partition plate 92, and the engagement piece 52a is movable within the space between the edge of the partition plate 92 and the inner wall of the case 41. The engagement piece 52a includes a contact surface 52c, which faces toward the edge of the partition plate 92. Accordingly, contact of the contact surface 52c of the engagement piece 52a with the edge of the partition plate 92 restricts leftward movement of the wire assembly 52.

When the first cam 43 rotates, the cam lobe 43a pushes the contact surface 51c. This moves the wire assembly 51 toward the right against the elastic force of the coil spring 53. Further, when the second cam 44 rotates, the cam lobe 44a pushes the contact surface 52c. This moves the wire assembly 52 toward the right against the elastic force of the coil spring 54.

Wires 55 and 56 are respectively fixed to the cylindrical sleeves 51b and 52b. The wire 55 includes a first end, which is inserted into the cylindrical sleeve 51b, and an opposite second end 55a. The second end 55a of the wire 55 extends out of the case 41 through a hole 93 formed in the left wall of the first accommodating portion 41a. In the same manner, the wire 56 includes a first end, which is inserted into the cylindrical sleeve 52b, and an opposite second end 56a. The second end 56a of the wire 56 extends out of the case 41 through a hole 94 formed in the left wall of the third accommodating portion 41c. In the present embodiment, the wire assembly 51 and the wire 55 form a lid restriction member, and the wire assembly 52 and the wire 56 form a second hook restriction member.

The second end 55a of the wire 55 is inserted into a tubular wire holder 65 in a movable manner. The wire 55 moves between a lid lock position, at which the second end 55a projects from a distal end of the wire holder 65, and a lid unlock position, at which the second end 55a is accommodated in the wire holder 65. As shown in FIGS. 6A to 6C, the wire holder 65 is fixed to the holder compartment 23. Thus, rightward movement of the wire assembly 51 moves the wire 55 to the right. This accommodates the second end 55a in the wire holder 65.

Figure 7A:
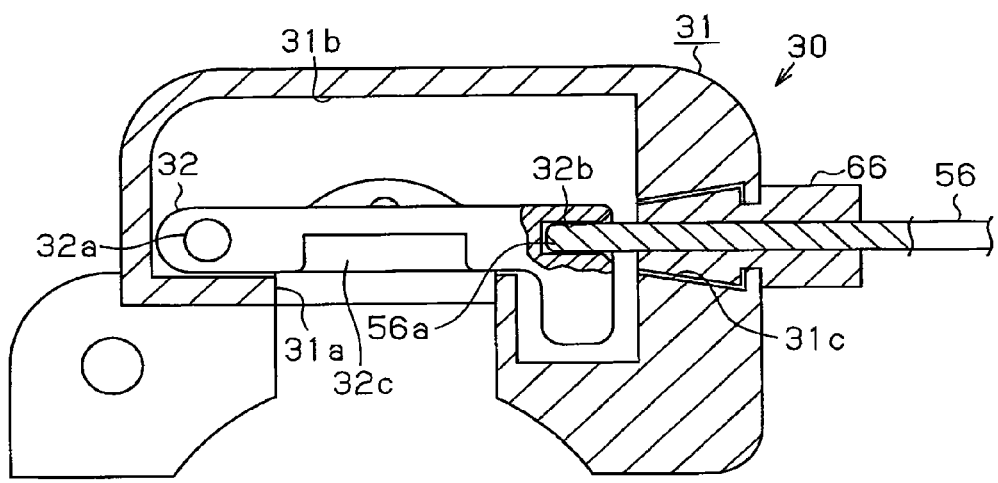
FIG. 7A is a cross-sectional view showing the lock mechanism of FIG. 3A when a lock bar is locked.
Figure 7B:
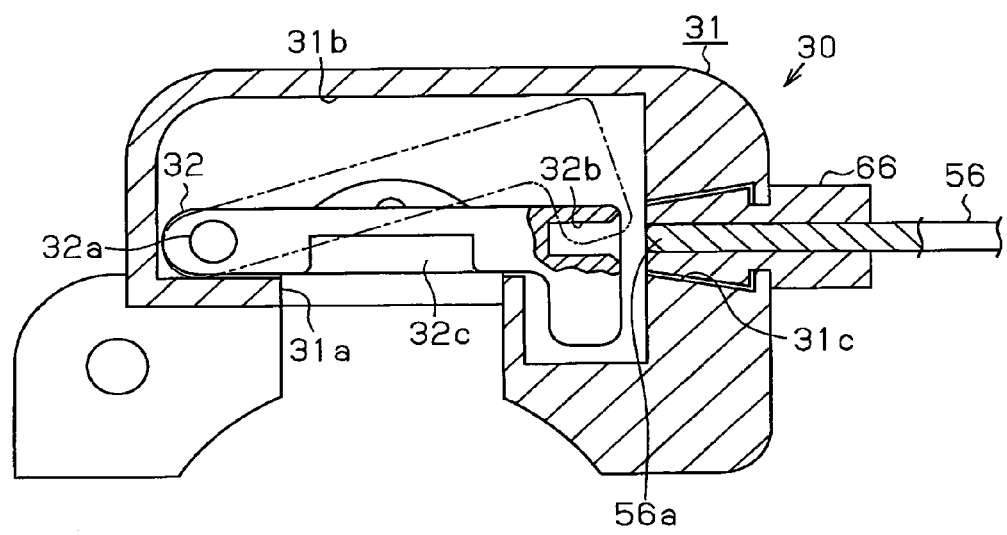
FIG. 7B is a cross-sectional view showing the lock mechanism of FIG. 3A when the lock bar is unlocked.

In the same manner, the second end 56a of the wire 56 is inserted into a tubular wire holder 66 in a movable manner. The wire 56 moves between a second hook lock position, at which the second end 56a projects from a distal end of the wire holder 66, and a second hook unlock position, at which the second end 56a is accommodated in the wire holder 66. As shown in FIGS. 7A and 7B, the wire holder 66 is fixed to the holder compartment 31c. Thus, rightward movement of the wire assembly 52 moves the wire 56 to the right. This accommodates the second end 56a in the wire holder 66.

As shown in FIG. 6C, when the power feeding lid 20 is closed, the second end 55a of the wire 55 is located at the lid lock position and inserted into the lock hole 21a. From the state of FIG. 6A in which the power feeding lid 20 opens the recess 1a, when the power feeding lid 20 is moved in a closing direction as shown in FIG. 6B, the spring 22 comes into contact with the inner surface of the power feeding lid 20. Here, the wire 55 comes into contact with the guide 21b of the lock piece 21. From this state, when the power feeding lid 20 is further moved in the closing direction against the elastic force of the spring 22, the inclination of the guide 21b pushes the wire 55 toward the right. As a result, the wire 55 moves toward the right against the elastic force of the coil spring 53 (refer to FIG. 9). That is, the guide 21b guides the second end 55a to the lid unlock position. From this state, when the power feeding lid 20 is further moved in the closing direction, the power feeding lid 20 completely closes the recess 1a. Here, the lock hole 21a faces toward the distal end of the holder compartment 23. This permits leftward projection of the wire 55. Accordingly, the elastic force of the coil spring 53 inserts the wire 55 into the lock hole 21a, which is arranged in the recess 1a. In other words, the second end 55a returns to the lid lock position, and the wire 55 engages with the lock piece 21. This restricts movement of the power feeding lid 20 in the opening direction.

When the power feeding lid 20 is closed, the inner surface of the power feeding lid 20 remains in contact with the spring 22. In other words, the spring 22 applies elastic force to the power feeding lid 20 in the opening direction. Accordingly, when the wire 55 is moved rightward and accommodated in the wire holder 65, that is, when the second end 55a moves away from the lock hole 21a to the lid unlock position, the elastic force of the spring 22 slightly moves the power feeding lid 20 in the opening direction. This allows the user to move the power feeding lid 20 in the opening direction.

Referring to FIG. 7A, the second end 56a of the wire 56 projects into the lock bar compartment 31b at the second hood lock position. In this case, when the lock bar 32 is positioned at the first hook lock position, the second end 56a is inserted into the lock recess 32b. Thus, the second end 56a, which is in contact with the inner wall of the lock recess 32b, restricts movement of the lock bar 32 to the first hook unlock position. Referring to FIG. 7B, the second end 56a does not interfere with the lock recess 32b as long as the second end 56a is accommodated in the wire holder 66, that is, as long as the second end 56a is located at the second hook unlock position. Accordingly, movement of the lock bar 32 from the first hook lock position to the first hook unlock position is permitted.

When the second end 56a is accommodated in the wire holder 66 (refer to FIG. 7B), the power feeding plug 10 (refer to FIG. 2) can be inserted into the inlet 5. When the power feeding plug 10 is inserted into the inlet 5, the hook 16 is guided by the inclined surface 5c to the upper surface of the catch 18, as shown in FIG. 8. The distal end of the hook 16 pushes the inclined surface 32c of the lock bar 32, as shown by the broken lines in FIG. 8. The inclined surface 32c receives an upward pushing force from the hook 16. This moves the lock bar 32 from the first hook lock position, which is indicated by the solid lines in FIG. 8, to the first hook unlock position, which is indicated by the broken lines in FIG. 8. As a result, further insertion of the power feeding plug 10 is permitted until the hook 16 reaches the engagement recess 18a. When reaching the engagement recess 18a, the pushing force of the hook 16 is eliminated, and the lock bar 32 falls to the first hook lock position, as indicated by the solid lines in FIG. 8. The lower surface of the lock bar 32 is located above the hook 16.

In a state in which the lock bar 32 is located at the first hook lock position, insertion of the wire 56 (second end 56a) into the lock recess 32b, that is, movement of the second end 56a to the second hook lock position, restricts movement of the lock bar 32 to the first hook unlock position. This keeps the hook 16 engaged with the engagement recess 18a (catch 18). In this state, when the operation portion 17 (refer to FIG. 2) is operated to tilt the hook 16, movement of the hook 16 is restricted by contact of the upper surface of the hook 16 with the lower surface of the lock bar 32. Since the hook 16 cannot be disengaged from the catch 18, the power feeding plug 10 cannot be disconnected from the inlet 5.

As long as the wire 56 is not inserted into the lock recess 32b, that is, as long as the second end 56a is located at the second hook unlock position, the hook 16 can be tilted by the operation portion 17. The hook 16 is tilted to push the lower surface of the lock bar 32 upward and move the lock bar 32 to the first hook unlock position. This disengages the hook 16 from the catch 18 and permits removal of the power feeding plug 10 from the inlet 5.

When the wire 56 is inserted into the lock recess 32b before the power feeding plug 10 is connected to the inlet 5, the power feeding plug 10 cannot be inserted into the inlet 5. That is, when movement of the lock bar 32 from the first hook unlock position is restricted, the lock bar 32 will not move to the first hook unlock position even when the distal end of the hook 16 pushes the inclined surface 32c. This prohibits connection of the power feeding plug 10 to the inlet 5.

The lock and unlock operation of the plug lock mechanism 30 and lid lock mechanism 25 when the actuator mechanism 40 is actuated will now be described.

First, state A shown in FIG. 9 will be described. Here, as shown in FIG. 10, the cam lobe 43a is oriented in the twelve o'clock direction, and the cam lobe 44a is oriented in the nine o'clock direction. Thus, the second ends 55a and 56a of the wires 55 and 56 are respectively projected out of the distal ends of the wire holders 65 and 66 (lid lock position and second hook lock position). Further, the power feeding lid 20 is closed. That is, the power feeding lid 20 is locked by the wire 55. Since the power feeding lid 20 is closed, the power feeding plug 10 is not inserted into the inlet 5.

In state A, when the motor 42 produces forward rotation, the motor shaft 42a rotates the worm gear 47 in the forward direction. This rotates the worm wheel 48, which is engaged with the worm gear 47, in the clockwise direction. Accordingly, the first cam 43 and second cam 44, which are arranged on the shaft 48a of the worm wheel 48, rotates in the clockwise direction.

Figure 11:
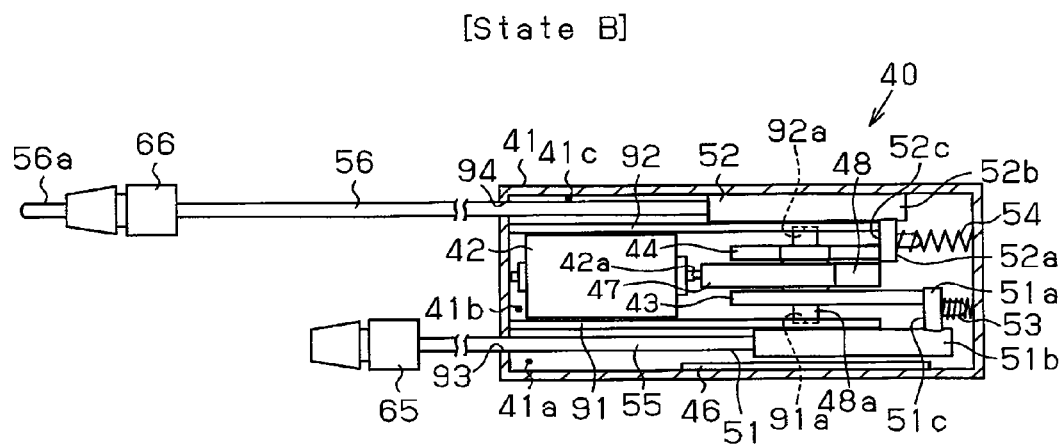
FIG. 11 is a front view showing the actuator mechanism when the lock bar restriction member is located at the lock position and the lid restriction member is located at an unlock position.
Figure 12:
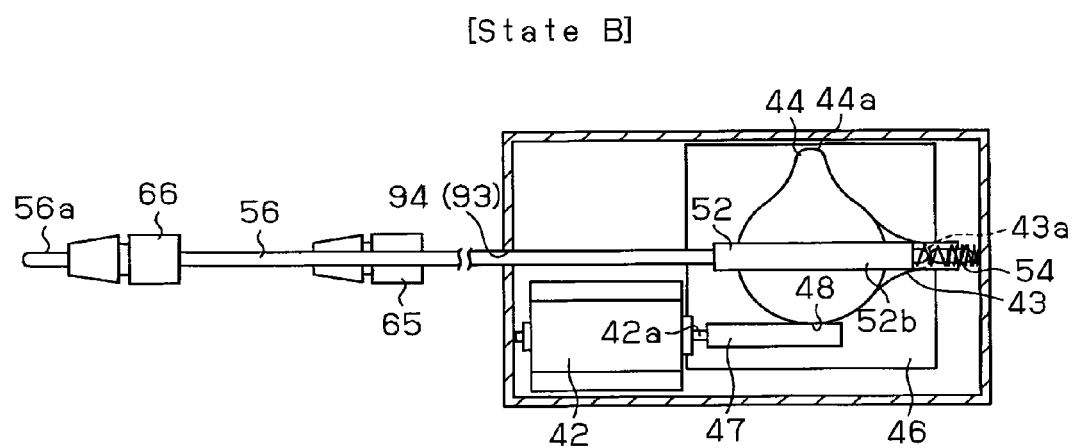
FIG. 12 is a plan view, partially in cross-section, showing the actuator mechanism of FIG. 11.

When the worm wheel 48 makes a one fourth rotation (90°) from state A, the wire assembly 51 shifts to state B shown in FIG. 11. This orients the cam lobe 43a in the three o'clock direction and the cam lobe 44a in the twelve o'clock direction, as shown in FIG. 12. Accordingly, when the cam lobe 43a pushes the contact surface 51c rightward, the wire assembly 51 is moved rightward against the elastic force of the coil spring 53. This moves the second end 55a of the wire 55 to the lid unlock position. In this state, the elastic force of the spring 22 opens the power feeding lid 20 (refer to FIG. 6B).

Figure 13:
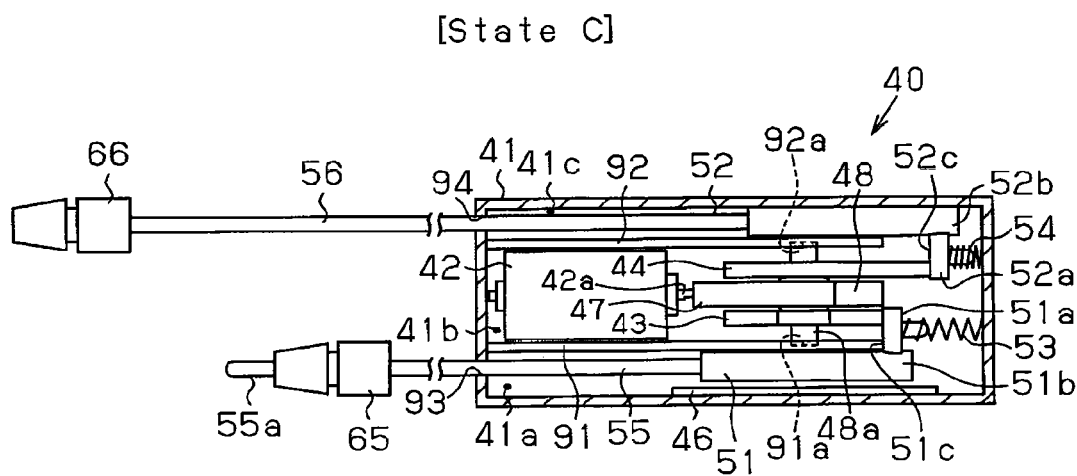
FIG. 13 is a front view showing the actuator mechanism when the lock bar restriction member is located at an unlock position and the lid restriction member is located at the lock position.
Figure 14:
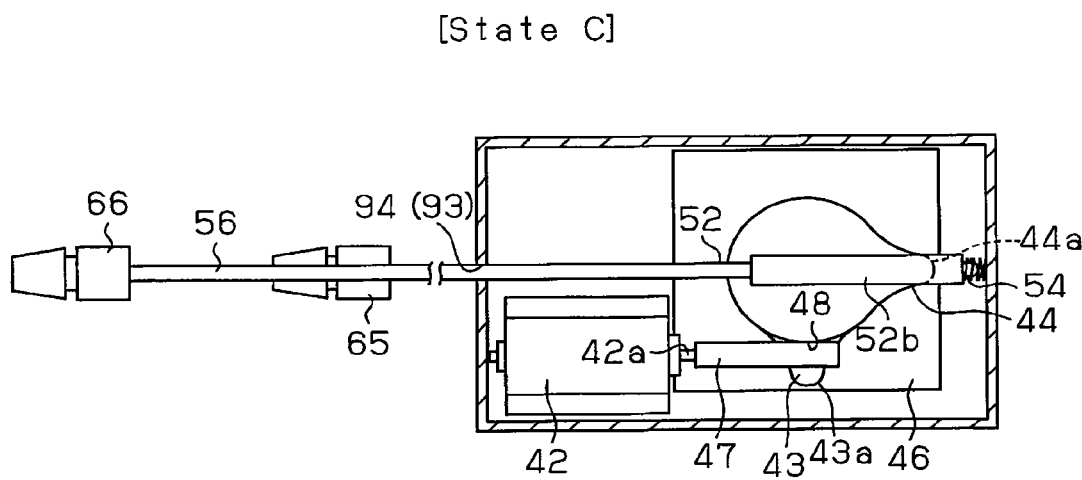
FIG. 14 is a plan view, partially in cross-section, showing the actuator mechanism of FIG. 13.

When the motor 42 produces further forward rotation and the worm wheel 48 makes a one fourth rotation from state B (two forth rotation from state A, that is, 180°), the wire assemblies 51 and 52 shift to a state C shown in FIG. 13. This orients the cam lobe 43a in the six o'clock direction and the cam lobe 44a in the three o'clock direction, as shown in FIG. 14. Accordingly, when the cam lobe 44a pushes the contact surface 52c rightward, the wire assembly 52 is moved rightward against the elastic force of the coil spring 54. This moves the second end 56a of the wire 56 to the second hook unlock position. Further, the cam lobe 43a is oriented in the six o'clock direction. Thus, the cam lobe 43a no longer applies a pushing force to the contact surface 51c. Accordingly, the elastic force of the coil spring 53 moves the wire assembly 51 leftward until the contact surface 51c contacts the edge of the partition plate 91. This moves the second end 55a of the wire 55 to the lid lock position.

Figure 15:
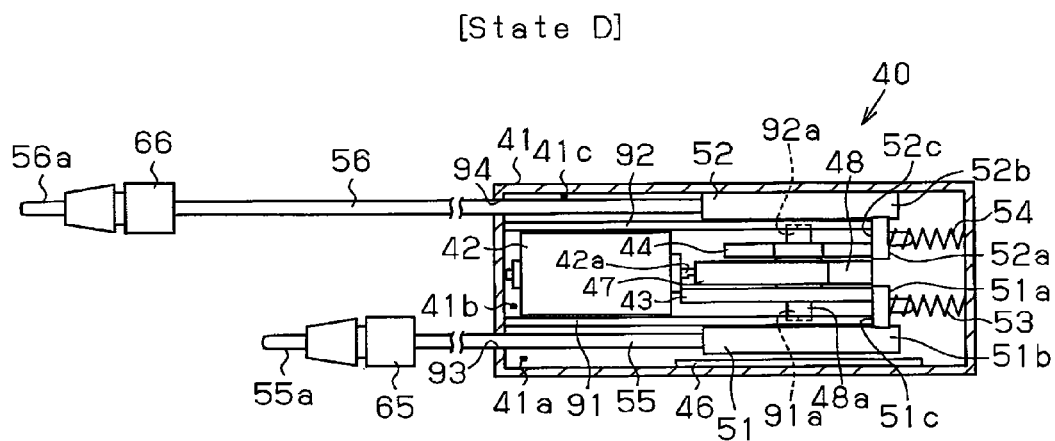
FIG. 15 is a front view showing the actuator mechanism when the lock bar restriction member and lid restriction member are both located at the lock position.
Figure 16:
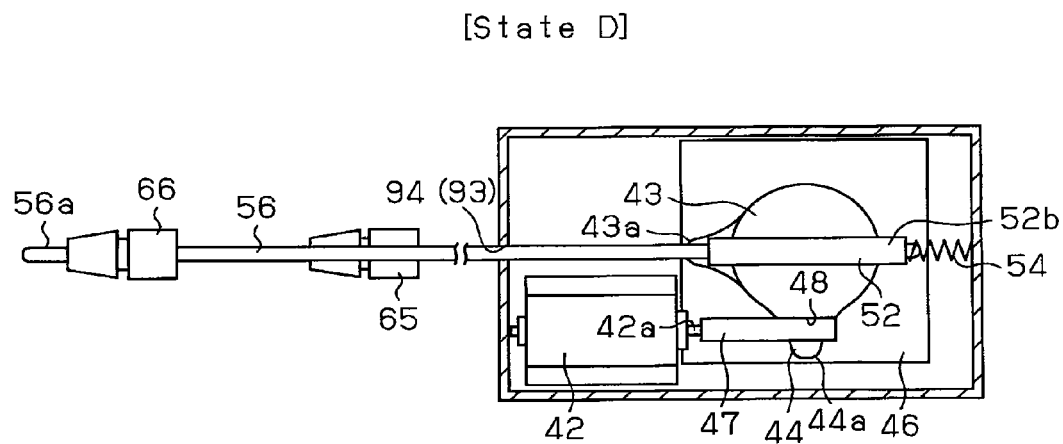
FIG. 16 is a plan view, partially in cross-section, showing the actuator mechanism of FIG. 15.

When the motor 42 produces further forward rotation and the worm wheel 48 makes a one fourth rotation from state C (three forth rotation from state A, that is, 270°), the wire assembly 52 shifts to state D shown in FIG. 15. This orients the cam lobe 43a in the nine o'clock direction and the cam lobe 44a in the six o'clock direction, as shown in FIG. 16. Thus, the cam lobe 44a no longer applies a pushing force to the contact surface 52c. Accordingly, the elastic force of the coil spring 54 moves the wire assembly 52 leftward until the contact surface 52c contacts the edge of the partition plate 92. This moves the second end 56a of the wire 56 to the second hook lock position.

When the motor 42 produces further forward rotation and the worm wheel 48 makes a one fourth rotation from state D (one rotation from state A, that is, 360°), the actuator mechanism 40 returns to the state A shown in FIG. 9.

Figure 17:
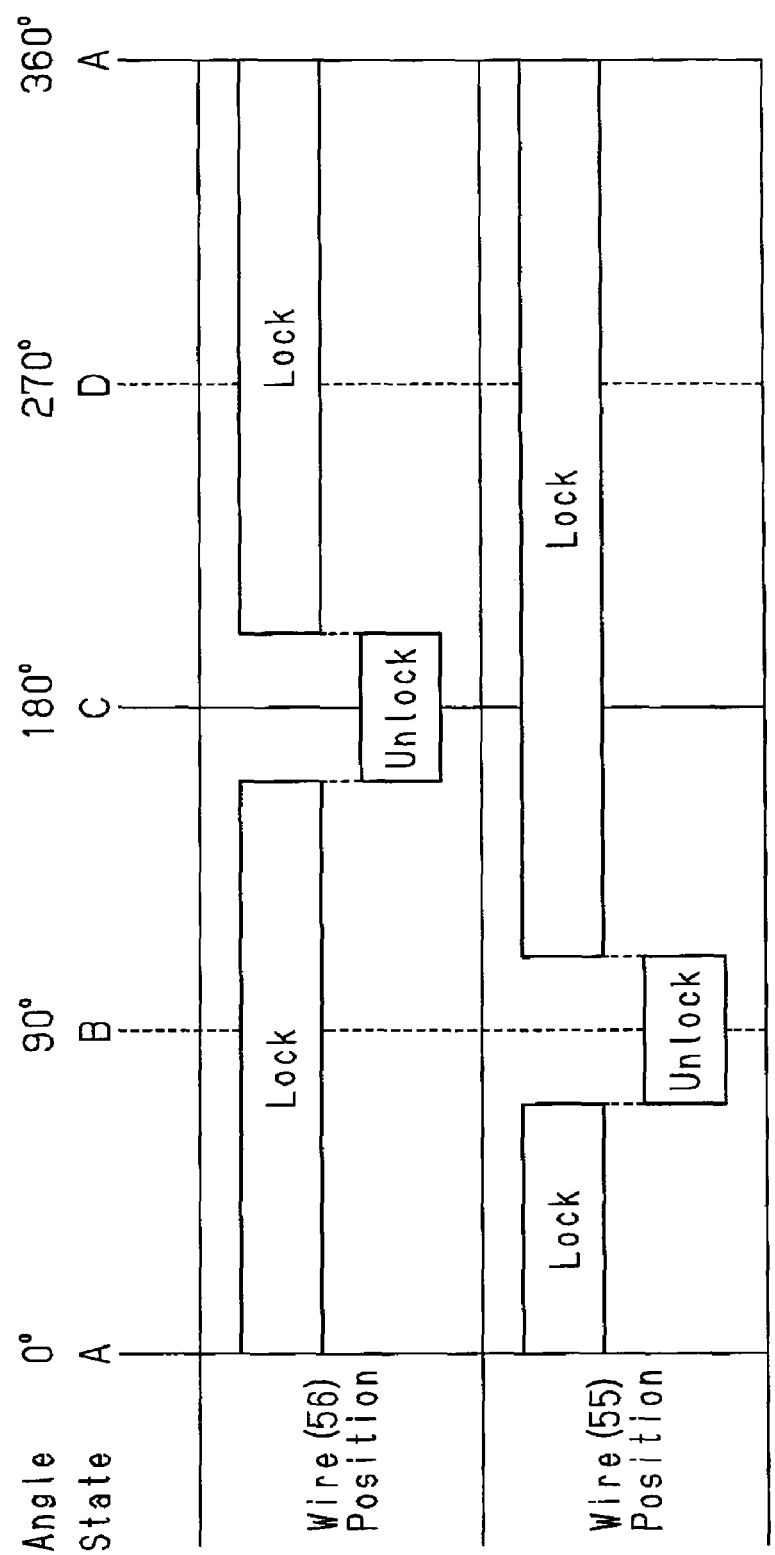
FIG. 17 is a chart showing the transition between the lock position and the unlock position of the lock bar restriction member and lid restriction member driven by the actuator mechanism.

The operation of the actuator mechanism 40 when connecting the power feeding plug 10 to the inlet 5 and charging the battery 4 with the external power supply 61 will now be described with reference to FIG. 17. First, the description will start from state A. Here, the power feeding lid 20 is in a closed state.

When recognizing operation of the removal switch 76 in a state in which ID authentication has been accomplished, the charging ECU 75 produces forward rotation with the motor 42 to shift the actuator mechanism 40 from state A to state B and then to state C. Here, the power feeding lid 20 is unlocked in state B and thus in an ajar state (refer to FIG. 6B). This allows for the user to open the ajar power feeding lid 20 (refer to FIG. 6A). After opening the power feeding lid 20, the user further opens the inlet lid 5d (refer to FIG. 3). Here, the actuator mechanism 40 is in state C. Thus, the lock bar 32 is switched to an unlock state and can be moved between the first hook lock position and the first hook unlock position. This allows for the user to insert the power feeding plug 10 into the inlet 5.

When the power feeding plug 10 is inserted into the inlet 5, the charging ECU 75 receives a connection signal from the charging device 62. The charging ECU 75 then starts to charge the battery 4 with the external power supply 61. Upon recognition of the connection of the power feeding plug 10 and the inlet 5, the charging ECU 75 produces forward rotation with the motor 42 and shifts the actuator mechanism 40 from state C to state D and then to state A. This inserts the second end 56a of the wire 56 into the lock recess 32b of the lock bar 32. Accordingly, the lock bar 32 is switched to a lock state and cannot be moved from the first hook lock position. Thus, the power feeding plug 10 cannot be removed from the inlet 5.

After the charging of the battery 4 is completed, when operation of the removal switch 76 is recognized in a state in which ID verification has been accomplished, the charging ECU 75 produces forward rotation with the motor 42 to shift the actuator mechanism 40 from state A to state B and then to state C. In state C, the lock bar 32 is unlocked and thus movable from the first hook lock position to the first hook unlock position. Here, by operating the operation portion 17 and disengaging the hook 16 from the catch 18, the power feeding plug 10 can be removed from the inlet 5. When the power feeding plug 10 is removed from the inlet 5 and the inlet lid 5d is closed, the power feeding lid 20 may be closed. When the power feeding lid 20 closes the recess 1a, the power feeding lid 20 pushes a micro-switch (not shown) arranged in the recess 1a. As a result, the charging ECU 75 receives a signal from the micro-switch and determines that the power feeding lid 20 has been closed. The charging ECU 75 then produces forward rotation with the motor 42 to shift the actuator mechanism 40 from state C to state D and then to state A. This ends the series of operations performed by the actuator mechanism 40 when charging the battery 4 with the external power supply 61.

(1) The power feeding plug 10 and the power feeding lid 20 are locked by the single motor 42. The wires 55 and 56 are moved by the same motor 42. This reduces the space occupied by the locking device 100. Further, in this structure, the control substrate of the motor 42 can also be shared by different parts. This further reduces the space required for the locking device 100 and decreases control substrate costs.

(2) Rotation produced in a single direction with the motor 42 controls the wire 56, which moves between the second hook lock position and the second hook unlock position, and the wire 55, which moves between the lid lock position and the lid unlock position. This simplifies the control of the motor 42.

(3) When the wire 55 moves to the lid unlock position, the elastic force of the spring 22 automatically moves and opens the power feeding lid 20. Further, the timing at which the wire 56 moves to the second hook unlock position differs from the timing at which the wire 55 moves to the lid unlock position. More specifically, after the first cam 43 engages with the wire assembly 51 and moves the wire 55 to the lid unlock position, the second cam 44 engages with the wire assembly 52 and moves the wire 56 to the hook unlock position. In this manner, after unlocking and opening the power feeding lid 20, the motor 42 switches the lock bar 32 to an unlock state. In this state, the power feeding plug 10 can be connected to the inlet 5. Further, once the power feeding lid 20 opens, the power feeding lid 20 may be closed without feeding power (i.e., without inserting the power feeding plug 10 into the inlet 5).

(4) When the second cam 44 engages with the wire assembly 52 (engagement piece 52a), the first cam 43 does not engage with the wire assembly 51 (engagement piece 51a). Further, when the first cam 43 engages with the wire assembly 51, the second cam 44 does not engage with the wire assembly 52. Thus, the power feeding plug 10 may be connected to the inlet 5 by controlling the motor 42 to stop the second cam 44 at a position at which it engages with the wire assembly 52. In other words, the motor 42 does not have to stop the first cam 43 at a position at which it engages with the wire assembly 51. Accordingly, the control of the motor 42 is facilitated.

(5) The lock bar 32 and wire 56 are separated from each other. Thus, only the case 31, which accommodates the lock bar 32 that directly acts on the hook 16, is fixed to the inlet 5. This minimizes the number of components arranged near the inlet. This allows for the arrangement of the locking device 100 even when it is difficult to provide space near the inlet 5. The wires 55 and 56 are used to perform the locking and unlocking operations with the plug lock mechanism 30 and the power feeding lid 20. Thus, the actuator mechanism 40 does not have to be arranged beside the inlet 5. In other words, the actuator mechanism 40 may be arranged anywhere inside the vehicle 1.

Figure 18:
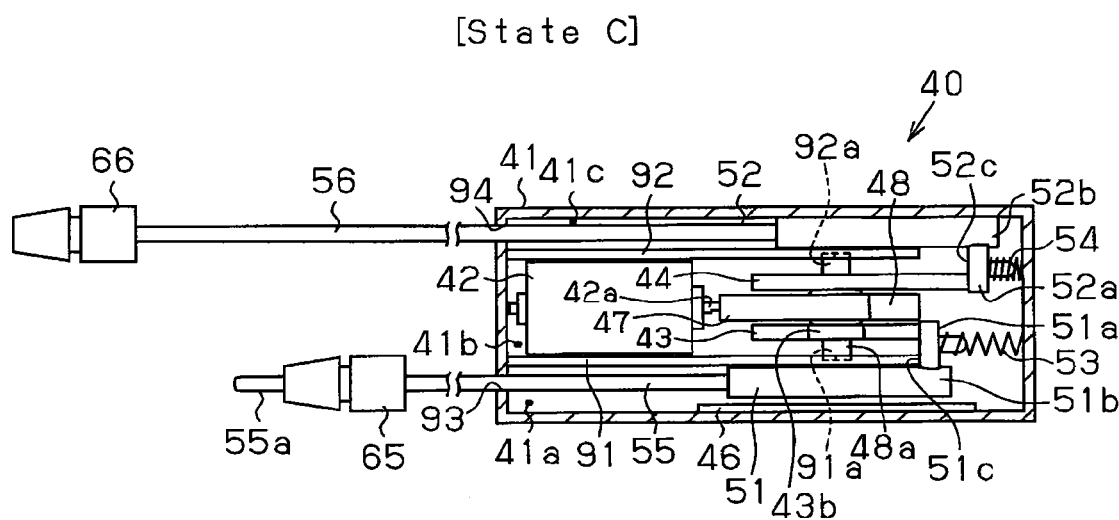
FIG. 18 is a front view showing an actuator mechanism according to a second embodiment of the present invention.
Figure 19:
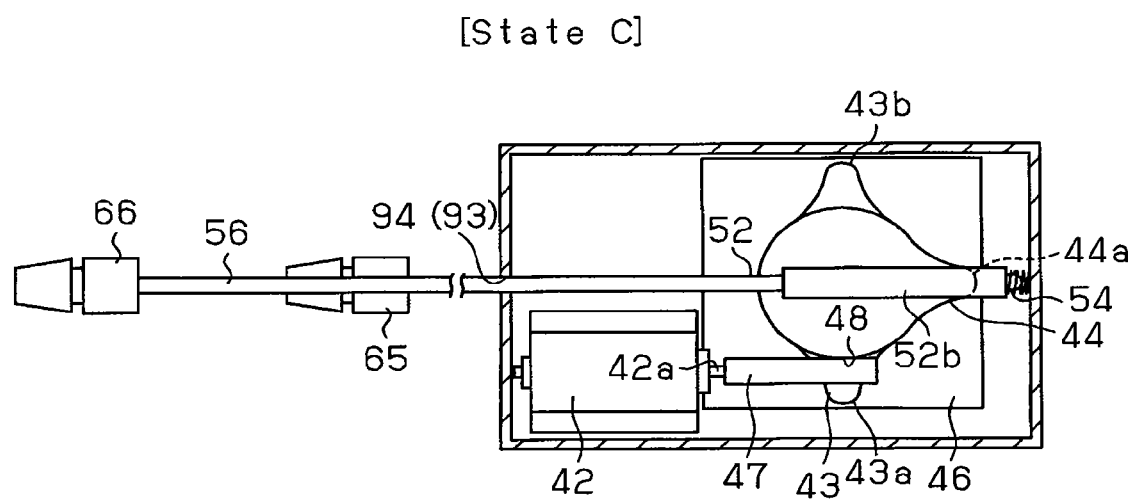
FIG. 19 is a plan view showing the actuator mechanism of FIG. 18.

A second embodiment will now be described with reference to FIGS. 18 to 20. The second embodiment differs from the first embodiment in the first cam 43. To avoid redundancy, like or same reference numerals are given to those components that are the same as the corresponding components of the first embodiment. Such components will not be described below.

In addition to the cam lobe 43a, the first cam 43 of the second embodiment includes a cam lobe 43b. The cam lobe 43a and cam lobe 43b are arranged on opposite sides of the first cam 43 with the shaft 48a arranged in between. As shown in FIGS. 18 and 19, when the actuator mechanism 40 is in an initial state C, the cam lobe 43a is oriented in the six o'clock direction, and the cam lobe 43b is oriented in the twelve o'clock direction. In this state, the cam lobe 44a of the second cam 44 is oriented in the three o'clock direction.

Figure 20:
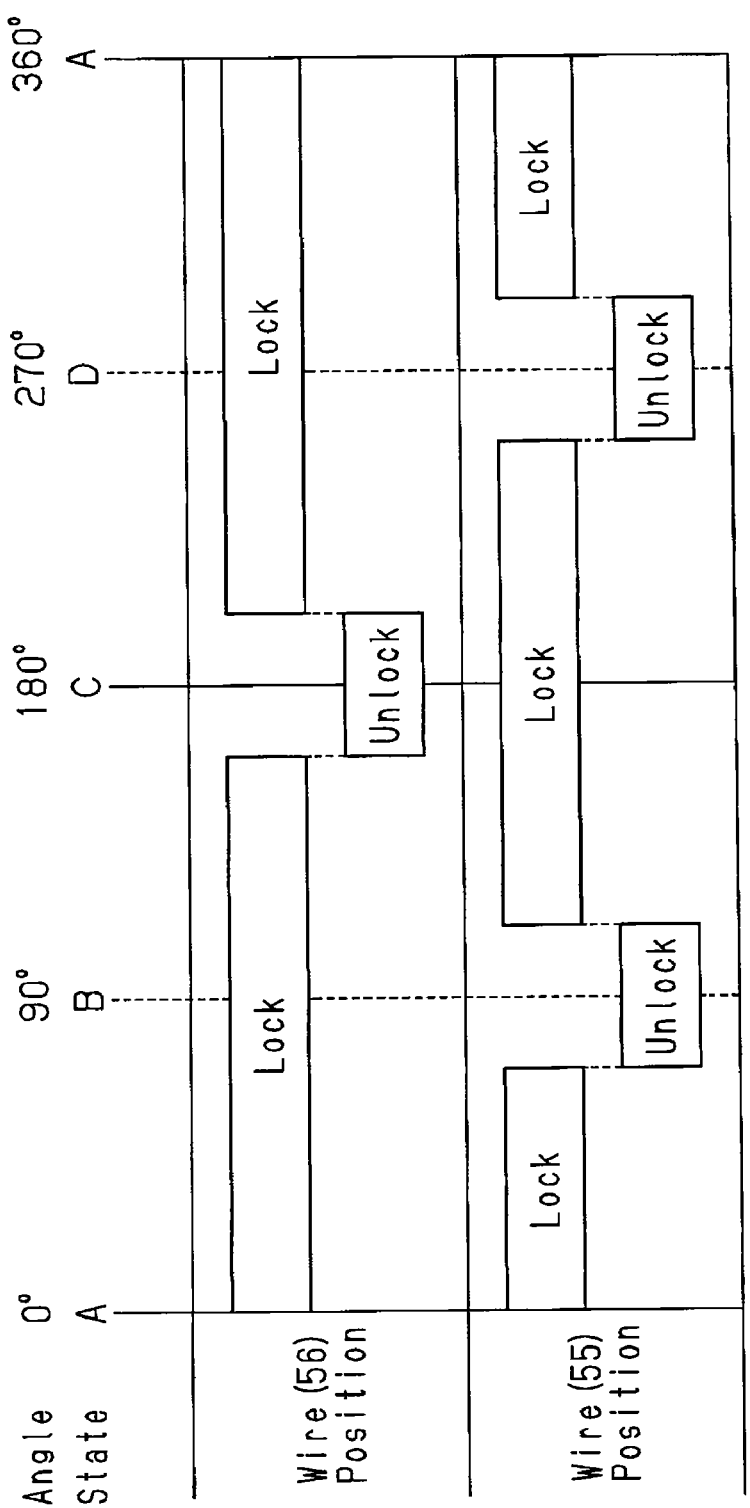
FIG. 20 is a chart showing the transition between the lock position and the unlock position of the lock bar restriction member and lid restriction member driven by the actuator mechanism of the second embodiment.

With reference to FIG. 20, the operation of the actuator mechanism 40 when connecting the power feeding plug 10 to the inlet 5 to charge the battery 4 with the external power supply 61 will now be described. The description will start from state C. Here, it is assumed that the power feeding lid 20 is closed.

When recognizing operation of the removal switch 76 in a state in which ID authentication has been accomplished, the charging ECU 75 produces forward rotation with the motor 42 to shift the actuator mechanism 40 from state C to states D, A, and B and then to state C. Here, the power feeding lid 20 has undergone at least state D and is thus in an ajar state (refer to FIG. 6B). This allows for the user to open the ajar power feeding lid 20 (refer to FIG. 6A). After opening the power feeding lid 20, the user further opens the inlet lid 5d (refer to FIG. 3). In state C, the lock bar 32 is switched to an unlock state and can be moved between the lock position and the unlock position. This allows for the user to insert the power feeding plug 10 into the inlet 5.

When the power feeding plug 10 is inserted into the inlet 5, the charging ECU 75 receives a connection signal from the charging device 62. The charging ECU 75 then starts to charge the battery 4 with the external power supply 61. Upon recognition of the connection of the power feeding plug 10 and the inlet 5, the charging ECU 75 produces forward rotation with the motor 42 and shifts the actuator mechanism 40 from state C to state D and then to state A. This inserts the second end 56a of the wire 56 into the lock recess 32b of the lock bar 32. Accordingly, the lock bar 32 is switched to a lock state and cannot be moved from the lock position. Thus, the power feeding plug 10 cannot be removed from the inlet 5.

After the charging of the battery 4 is completed, when operation of the removal switch 76 is recognized in a state in which ID verification has been accomplished, the charging ECU 75 produces forward rotation with the motor 42 to shift the actuator mechanism 40 from state A to state B and then to state C. In state C, the lock bar 32 is unlocked and thus movable to the unlock position. Here, by operating the operation portion 17 and disengaging the hook 16 from the catch 18, the power feeding plug 10 can be removed from the inlet 5. When the power feeding plug 10 is removed from the inlet 5 and the inlet lid 5*d* is closed, the power feeding lid 20 may be closed. This ends the series of operations performed by the actuator mechanism 40 when charging the battery 4 with the external power supply 61.

Such a structure eliminates the need for the micro-switch (not shown) of the first embodiment. In the first embodiment, the initial state of the actuator mechanism 40 is state A. Thus, the micro-switch is required to detect closing of the power feeding lid 20. In contrast, in the second embodiment, the initial state of the actuator mechanism 40 is state C. Thus, there is no need to shift to state A. This allows for the elimination of the micro-switch.

In addition to advantages (1) to (5) of the first embodiment, the locking device 100 of the second embodiment has the following advantage.

(6) The micro-switch of the first embodiment is not necessary.

A third embodiment will now be described with reference to FIGS. 21 and 22. The third embodiment differs from the first embodiment in the second cam 44. To avoid redundancy, like or same reference numerals are given to those components that are the same as the corresponding components of the first embodiment. Such components will not be described below.

Figure 21:
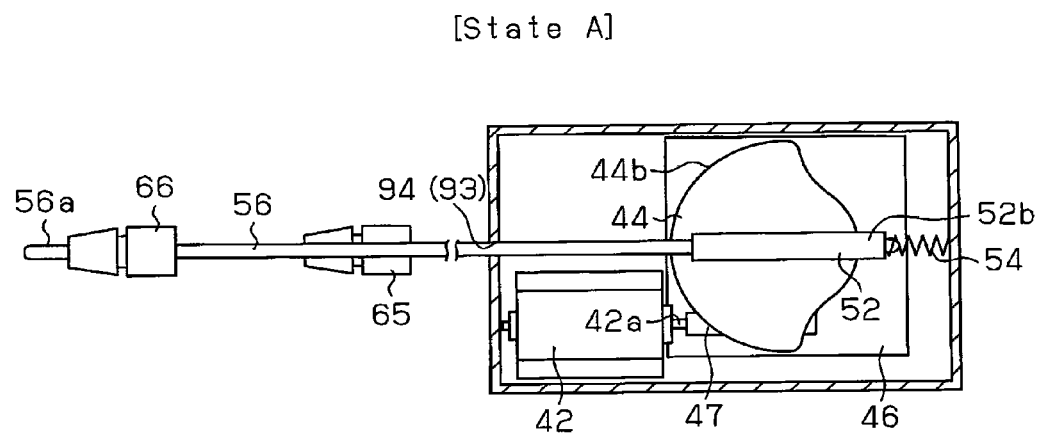
FIG. 21 is a front view showing an actuator mechanism according to a third embodiment of the present invention.

As shown in FIG. 21, instead of the cam lobe 44*a* of the first embodiment, a triangular cam lobe 44*b* (first projection) projects from the second cam 44. The cam lobe 44*b* extends over about one half of the circumference of the second cam 44. As shown in FIG. 21, when the actuator mechanism 40 is in state A, the cam lobe 44*b* extends from the twelve o'clock direction via the nine o'clock direction to the six o'clock direction. Accordingly, the cam lobe 43*a* of the first cam 43 is covered by the cam lobe 44*b* (refer to FIG. 10 for the shape of the cam lobe 43*a*).

Figure 22:
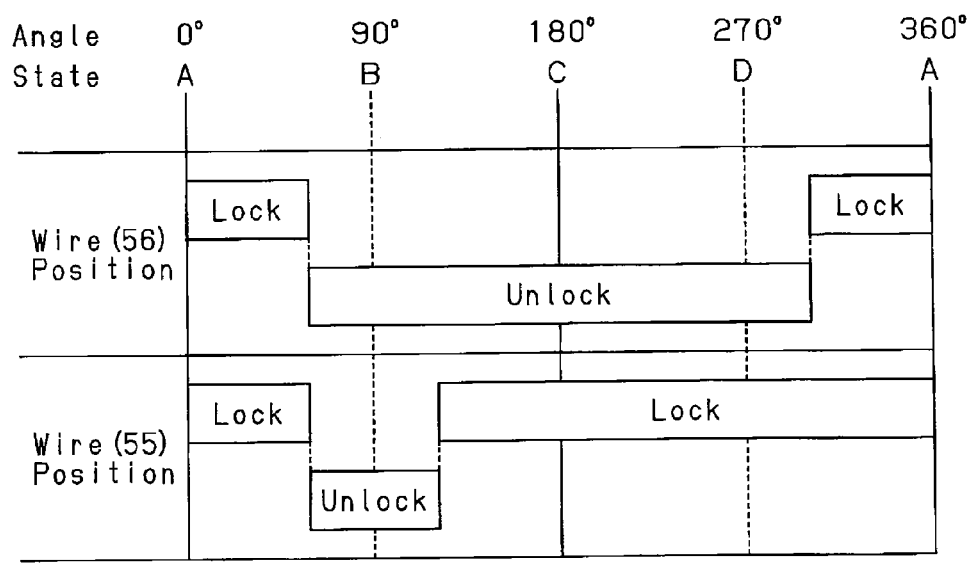
FIG. 22 is a chart showing the transition between the lock position and the unlock position of the lock bar restriction member and lid restriction member driven by the actuator mechanism of the third embodiment.

With reference to FIG. 22, the operation of the actuator mechanism 40 when connecting the power feeding plug 10 to the inlet 5 to charge the battery 4 with the external power supply 61 will now be described.

As shown in FIG. 22, the third embodiment differs from the first embodiment (refer to FIG. 17) in the time in which the second end 56*a* of the wire 56 is located at the lock position and unlock position. In the third embodiment, the triangular cam lobe 44*b* extends over about one half of the circumference of the second cam 44. This increases the angular range in which the cam lobe 44*b* and the wire assembly 52 (engagement piece 52*a*) remain engaged when the second cam 44 rotates. More specifically, the cam lobe 44*b* and the wire assembly 52 are engaged with each other during the period in which the cam 44 is in state B to state D. In the same manner as in the first embodiment, the motor 42 is temporarily stopped in state C. Thus, even when the second cam 44 stops at a displaced position in state C for one reason or another, the cam lobe 44*b* and the wire assembly 52 remain engaged. In other words, the second end 56*a* remains at the second hook unlock position. Accordingly, as long as the power feeding lid 20 is open, the user can insert the power feeding plug 10 into the inlet 5 even if the cam 44 stops at a displaced position.

In the third embodiment, as indicated by state B, the second end 56*a* moves to the second hook unlock position at the same time as when the power feeding lid 20 opens. Thus, the power feeding plug 10 can be smoothly inserted into the inlet 5 the moment the power feeding lid 20 opens. In other words, the user does not have to wait for the second cam 44 to shift to state C when inserting the power feeding plug 10 into the inlet 5.

In addition to advantages (1) to (5) of the first embodiment, the locking device of the third embodiment has the following advantage.

(7) Since the cam lobe 44*b* is triangular, the user can insert the power feeding plug 10 into the inlet 5 even if the cam 44 stops at a displaced position. Further, the second end 56*a* of the wire 56 moves to the second hook unlock position at the same time as when the power feeding lid 20 opens. Thus, the power feeding plug 10 can be smoothly inserted into the inlet 5 the moment the power feeding lid 20 opens. In other words, the user does not have to wait for the second cam 44 to shift to state C when inserting the power feeding plug 10 into the inlet 5.

It should be apparent to those skilled in the art that the present invention may be embodied in many other specific forms without departing from the spirit or scope of the invention. Particularly, it should be understood that the present invention may be embodied in the following forms.

In each of the embodiments described above, the motor 42 may directly rotate the first cam 43 and the second cam 44 without using the worm gear 47 and the worm wheel 48. That is, the first cam 43 and second cam 44 may be directly coupled to the motor shaft 42*a*.

Figure 23A:
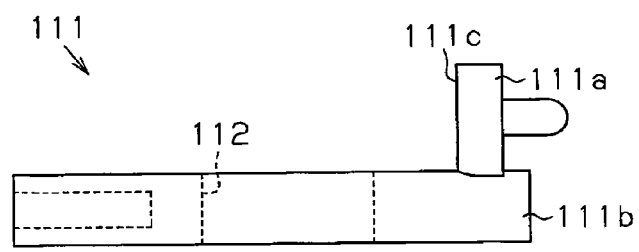
FIG. 23A is a front view showing a wire assembly according to a further embodiment of the present invention.
Figure 23B:
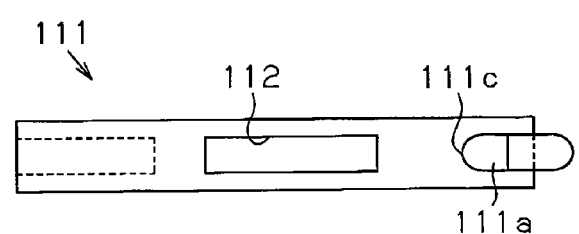
FIG. 23B is a plan view showing the wire assembly of FIG. 23A.
Figure 23C:
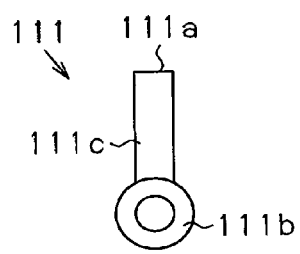
FIG. 23C is a side view showing the wire assembly of FIG. 23A.
Figure 24:
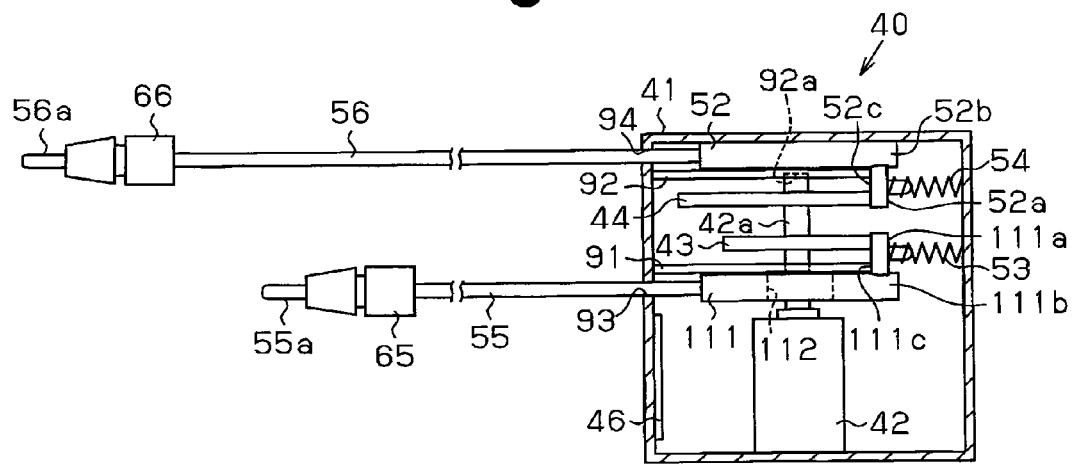
FIG. 24 is a front view showing an actuator mechanism according to another embodiment of the present invention.

For example, as shown in FIGS. 23A to 23C, an L-shaped wire assembly 111 may be formed. In the same manner as the embodiments described above, the wire assembly 111 includes an engagement piece 111*a* and a cylindrical sleeve 111*b*. The engagement piece 111*a* includes a contact surface 111*c*. A hole 112 extends through the cylindrical sleeve 111*b* in a direction perpendicular to the axial direction of the cylindrical sleeve 111*b*. The hole 112 is elongated in the axial direction of the cylindrical sleeve 111*b*. As shown in FIG. 24, the wire assembly 111 may replace the wire assembly 51 of the embodiments described above. In this case, the motor 42 may be moved from the second accommodating portion 41*b* to the first accommodating portion 41*a* and fixed to the inner wall (lower wall) of the case 41. Accordingly, the substrate 46 may be fixed to the left wall surface of the case 41 at the left side of the motor 42. Here, the motor 42 is fixed so that the motor shaft 42*a* projects upward. The motor shaft 42*a* is inserted through the hole 112. The first cam 43 and second cam 44 are fixed to an end of the motor shaft 42*a*, which is inserted through the hole 112. As a result, the motor shaft 42*a* rotates integrally with the first cam 43 and the second cam 44.

Such a structure obtains the advantages of the embodiments described above. Further, the worm gear 47 and the worm wheel 48 may be eliminated. Thus, there is no mechanical load that would be produced between the worm gear 47 and the worm wheel 48. This reduces the load applied to the motor 42.

In each of the embodiments described above, the first cam 43 and the second cam 44 may be formed integrally, with each other. In other words, the first and second cams 43 and 44 may be formed as a single cam. Further, the first cam 43, the second cam 44, and the worm wheel 48 may be integrated with one another.

In each of the embodiments described above, the motor 42 may produce backward rotation to rotate the first cam 43 and second cam 44 in a backward direction. Further, the forward rotation and the backward rotation of the motor 42 may be combined.

In the embodiments described above, the wires 55 and 56 may be rods.

In the embodiments described above, the wires 55 and 56 may be inserted into a tube in a movable manner. For example, the case 41 and the wire holders 66 and 66 may be coupled to the tube, and the wires 55 and 56 may be inserted through the tube. In such a case, the wires 55 and 56 do not directly contact any component of the vehicle 1. Accordingly, even when the wires 55 and 56 are laid out in a complex manner between components of the vehicle 1, the wires 55 and 56 can smoothly move through the tubes between the lock position and the unlock position.

In the embodiments described above, the inlet 5 is arranged in the right front wall of the vehicle 1 but is not limited to such a location. The inlet 5 may be arranged anywhere, such as the rear side or front side surface of the vehicle.

In the embodiments described above, the hook 16 is arranged above the coupler 14, of the power feeding plug 10. Instead, a plurality of hooks 16 may be arranged at locations such as above and below the coupler 14 so as to sandwich the coupler 14.

In the embodiments described above, the hook 16 may be arranged in the inlet 5, and the catch 18 may be arranged in the power feeding plug 10.

In the embodiment described above, the drive source is not limited to the motor 42 and other driving devices may be used instead, such as a rotary solenoid.

In the embodiments described above, the verification of the vehicle key is not limited to the ID verification performed on the electronic key 80 and may be a mechanical verification performed on a mechanical key.

In the embodiments described above, the electronic key system 70 may adopt an immobilizer system that uses a transponder to transmit the ID code.

In the embodiment described above, the frequency of the radio wave used in the electronic key system 70 is not limited to LF or UHF and other frequencies may be used. The frequency when transmitting radio wave from the vehicle 1 to the electronic key 80 and the frequency when returning the radio wave from the electronic key 80 to the vehicle 1 do not have to be different frequencies and may be the same frequency.

In the embodiments described above, the user verification is not necessarily limited to the key verification performed on the electronic key 80 and may be another type of verification, such as biometric verification.

In the embodiments described above, the locking device 100 is applied to the inlet 5 of the plug-in type hybrid vehicle 1. Instead, the locking device 100 may be applied to the inlet of an electric vehicle.

In the embodiment described above, the application of the locking device 100 is not limited to the vehicle 1. The locking device 100 may be applied to any device or equipment including having a rechargeable battery, such as an electrical motorcycle.

The present examples and embodiments are to be considered as illustrative and not restrictive, and the invention is not to be limited to the details given herein, but may be modified within the scope and equivalence of the appended claims.

The invention claimed is:

1. A locking device that locks a power feeding plug to a power receiving connector and locks a lid covering the power receiving connector, one of the power feeding plug and the power receiving connector including a hook, the other one of the power feeding plug and the power receiving connector including a catch, the locking device comprising:
a first hook restriction member moved between a first hook lock position, at which the first hook restriction member holds the hook on the catch, and a first hook unlock position, at which the first hook restriction member permits the hook to move away from the catch, wherein when the hook moves away from the catch, the first hook restriction member moves to the first hook unlock position in cooperation with the hook;
a second hook restriction member moved between a second hook lock position, at which the second hook restriction member engages with the first hook restriction member located at the first hook lock position and restricts movement of the first hook restriction member, and a second hook unlock position, at which the second hook restriction member disengages from the first hook restriction member and permits movement of the first hook restriction member;
a lid restriction member moved between a lid lock position, at which the lid restriction member engages with a lid engagement member arranged on the lid and restricts opening and closing of the lid, and a lid unlock position, at which the lid restriction member disengages from the lid engagement member and permits opening and closing of the lid; and
a drive source operably coupled to both of the second hook restriction member and the lid restriction member.

2. The locking device according to claim 1, further comprising a cam that moves in cooperation with the drive source, wherein the second hook restriction member is engaged with the cam and thereby moved between the second hook lock position and the second hook unlock position, while the lid restriction member is engaged with the cam and thereby moved between the lid lock position and the lid unlock position.

3. The locking device according to claim 2, wherein:
the first hook restriction member is pushed by the hook and moved to the first hook unlock position when the power feeding plug is connected to the power receiving connector;
the cam includes a first projection projected radially from the cam, wherein the first projection moves the second hook restriction member from the second hook lock position to the second hook unlock position as the cam rotates; and
the cam stops at a position where the first projection engages with the second hook restriction member.

4. The locking device according to claim 3, further comprising an urging member that urges the lid in an opening direction, wherein:
the cam includes a second projection projected radially from the cam, wherein the second projection moves the lid restriction member from the lid lock position to the lid unlock position as the cam rotates, and
the first projection and the second projection are arranged at separate positions in the direction in which the cam rotates so that the second projection does not engage with the lid restriction member when the first projection engages with the second hook restriction member and so that the first projection does not engage with the second hook restriction member when the second projection engages with the lid restriction member.

5. The locking device according to claim 2, further comprising:
a first case that accommodates the first hook restriction member and is fixed to the power receiving connector; and a second case that accommodates the second hook restriction member, the drive source, and the cam, wherein the first case and the second case are arranged at separate positions.

6. The locking device according to claim 5, wherein the second case further accommodates the lid restriction member.

7. The locking device according to claim 2, wherein the drive source includes a motor, and the motor rotates the cam in a single direction to move the second hook restriction member to the second hook unlock position and the lid restriction member to the lid unlock position at different timings.

8. The locking device according to claim 3, wherein the first projection is triangular.

9. The locking device according to claim 3, wherein:
the cam includes a second projection projected radially from the cam, wherein the second projection moves the lid restriction member from the lid lock position to the lid unlock position as the cam rotates; and
the second projection engages with the lid restriction member within a rotational angular range in which the first projection engages with the second hook restriction member.

* * * * *